(12) United States Patent
Hinshaw et al.

(10) Patent No.: US 7,529,752 B2
(45) Date of Patent: *May 5, 2009

(54) ASYMMETRIC STREAMING RECORD DATA PROCESSOR METHOD AND APPARATUS

(75) Inventors: Foster D. Hinshaw, Somerville, MA (US); Sanjay G. Dixit, Southborough, MA (US); John K. Metzger, Westborough, MA (US); David L. Meyers, Shrewsbury, MA (US); Venkannababu Tammisetti, Shrewsbury, MA (US); Premanand Yerabothu, Southborough, MA (US); Barry M. Zane, Wayland, MA (US)

(73) Assignee: Netezza Corporation, Marlborough, MA (US)

( * ) Notice: Subject to any disclaimer, the term of this patent is extended or adjusted under 35 U.S.C. 154(b) by 893 days.

This patent is subject to a terminal disclaimer.

(21) Appl. No.: 10/666,729

(22) Filed: Sep. 18, 2003

(65) Prior Publication Data

US 2004/0117037 A1    Jun. 17, 2004

Related U.S. Application Data

(60) Provisional application No. 60/412,057, filed on Sep. 19, 2002, provisional application No. 60/411,686, filed on Sep. 18, 2002.

(51) Int. Cl.
*G06F 7/00* (2006.01)
*G06F 17/30* (2006.01)

(52) U.S. Cl. .................... 707/10; 707/103 X; 700/2; 709/213

(58) Field of Classification Search ............... 707/1–10, 707/100–104.1, 200–206; 709/201; 700/2
See application file for complete search history.

(56) References Cited

U.S. PATENT DOCUMENTS

| 4,068,301 A | 1/1978 | Ishino et al. |
|---|---|---|
| 4,594,655 A | 6/1986 | Hao et al. |
| 4,811,214 A | 3/1989 | Nosenchuck et al. |
| 5,687,363 A | 11/1997 | Oulid-Aissa et al. |
| 5,701,460 A | 12/1997 | Kaplan et al. |

(Continued)

FOREIGN PATENT DOCUMENTS

WO       WO 98/55946       12/1998

OTHER PUBLICATIONS

Anurag Acharya et al., Tuning the performance of I/O-intensive parallel applications, May 1996, ACM, 15-27.*

(Continued)

*Primary Examiner*—Jean B Fleurantin
(74) *Attorney, Agent, or Firm*—Hamilton, Brook, Smith & Reynolds, P.C.

(57) ABSTRACT

An asymmetric data record processor and method includes host computers and Job processing units (JPU's) coupled together on a network. Each host computer and JPU forms a node on the network. A plurality of software operators allow each node to process streams of records. For each operator in a given sequence within nodes and across nodes, output of the operator is input to a respective succeeding operator. Data processing follows a logical data flow based on readiness of a record. As soon as a record is ready it is passed for processing from one part to a next part in the logical data flow. The flow of records during data processing is substantially continuous and of a streaming fashion.

43 Claims, 8 Drawing Sheets

U.S. PATENT DOCUMENTS

| | | | |
|---|---|---|---|
| 5,721,909 | A | 2/1998 | Oulid-Aissa et al. |
| 5,781,897 | A | 7/1998 | Chen et al. |
| 5,822,527 | A | 10/1998 | Post |
| 5,835,755 | A | 11/1998 | Stellwagen, Jr. |
| 5,860,087 | A | 1/1999 | Maeda et al. |
| 5,884,299 | A | 3/1999 | Ramesh et al. |
| 5,937,401 | A | 8/1999 | Hillegas |
| 5,937,415 | A | 8/1999 | Sheffield et al. |
| 5,983,270 | A | 11/1999 | Abraham et al. |
| 5,999,937 | A | 12/1999 | Ellard |
| 6,078,955 | A | 6/2000 | Konno et al. |
| 6,138,118 | A | 10/2000 | Koppstein et al. |
| 6,151,602 | A | 11/2000 | Hejlsberg et al. |
| 6,295,533 | B2 | 9/2001 | Cohen |
| 6,332,163 | B1 | 12/2001 | Bowman-Amuah |
| 6,339,772 | B1 | 1/2002 | Klein et al. |
| 6,345,206 | B1 | 2/2002 | Adamy et al. |
| 6,415,373 | B1 | 7/2002 | Peters et al. |
| 6,434,649 | B1 | 8/2002 | Baker et al. |
| 6,477,540 | B1 * | 11/2002 | Singh et al. ............. 707/103 R |
| 6,493,701 | B2 | 12/2002 | Ponnekanti |
| 6,493,761 | B1 | 12/2002 | Baker et al. |
| 6,507,834 | B1 | 1/2003 | Kabra et al. |
| 6,529,896 | B1 | 3/2003 | Leung et al. |
| 6,542,508 | B1 | 4/2003 | Lin |
| 6,542,886 | B1 | 4/2003 | Chaudhuri et al. |
| 6,594,651 | B2 | 7/2003 | Kabra et al. |
| 6,601,064 | B1 | 7/2003 | Nag et al. |
| 6,721,749 | B1 | 4/2004 | Najm et al. |
| 6,732,084 | B1 | 5/2004 | Kabra et al. |
| 6,789,116 | B1 | 9/2004 | Sarkissian et al. |
| 6,996,117 | B2 | 2/2006 | Lee et al. |
| 2001/0036322 | A1 | 11/2001 | Bloomfield et al. |
| 2002/0038313 | A1 | 3/2002 | Klein et al. |
| 2002/0052749 | A1 | 5/2002 | Bauer |
| 2002/0095400 | A1 | 7/2002 | Johnson et al. |
| 2002/0116358 | A1 | 8/2002 | Heath |
| 2002/0128823 | A1 | 9/2002 | Kovacevic |
| 2002/0161748 | A1 | 10/2002 | Hamel et al. |
| 2003/0009531 | A1 | 1/2003 | Richmann et al. |
| 2003/0126056 | A1 | 7/2003 | Hausman et al. |
| 2003/0212668 | A1 | 11/2003 | Hinshaw et al. |
| 2004/0133565 | A1 | 7/2004 | Hinshaw et al. |
| 2004/0148420 | A1 | 7/2004 | Hinshaw et al. |
| 2005/0021813 | A1 | 1/2005 | Kovacevic et al. |
| 2005/0154705 | A1 | 7/2005 | Zwiegincew et al. |

OTHER PUBLICATIONS

Sungdo Moon et al., Evaluation of predicated array data-flow analysis for automatic parallelization, Aug. 1999, ACM, 84-95.*

Acharya, A., et al., "Active Disks: Programming Model, Algorithms and Evaluation," ACM *Sigplan Notices, Association for Computing Machinery*, (33)11:81-91 (Nov. 1998).

Keeton, K., et al., "A Case for Intelligent Disks (IDISKs)," *SIGMOD Record*, (27)3:41-52, (Sep. 1998).

Graefe, G., "Query Evaluation Techniques for Large Databases," *ACM Computing Surveys*, (25)2:73-170, (Jun. 1993).

Dewitt, D., et al., "Parallel Database Systems: The Future of High Performance Database Systems," *Communications of the Association for Computing Machinery* (3):6:85-98, (Jun. 1992).

Uysal, M., et al., "Evaluation of Active Disks for Decision Support Databases," *IEEE*, pp. 337-348, (1999).

Guyetant, S., et al., "Architecture Parallèle Reconfigurable Pour La Génoique," RENPAR'14, ASF, Sympa Conference, pp. 1-4, (Apr. 2002).

Riedel, E., et al., "Active Disks for Large-Scale Data Processing," *Computer, IEEE*, (34)6:68-74, (2001).

Hsu, W. W., et al., "Projecting the Performance of Decision Support Workloads on Systems with Smart Storage (SmartSTOR)," *IEEE*, pp. 417-425, (2000).

Dimakopoulos, V. V., et al., "The SMart Autonomous Storage (SMAS) System," *IEEE*, vol. 1, pp. 303-306, (2001).

Memik, G., et al., "Design and Evaluation of a Smart Disk Cluster for DSS Commercial Workloads," *J. of Parallel and Distributed Computing*, (61)1633-1664, (2001).

Wickremesinghe, R., et al., "Distributed Computing with Load-Managed Active Storage," Proceedings of the 11th IEEE International Symposium on High Performance Distributed Computing HPDC-11 2002) (HPDC'02), pp. 13-23, (Jul. 2002).

Leilich, H., et al., "A Search Processor for Data Base Management Systems," Proceedings of the Fourth International Conference on Very Large Data Bases, IEEE, pp. 280-287, (Sep. 1978).

* cited by examiner

ASYMMETRIC STREAMING RECORD DATA PROCESSOR METHOD AND APPARATUS

RELATED APPLICATIONS

This application claims the benefit of U.S. Provisional Application No. 60/412,057 entitled "Asymmetric Streaming Record Processing Computer System," filed on Sep. 19, 2002, and U.S. Provisional Application No. 60/411,686 entitled "Intelligent Storage Device Controller," filed on Sep. 18, 2002. The entire teachings of these provisional applications are hereby incorporated by reference.

This application is also related to U.S. Patent Application entitled "Intelligent Storage Device Controller," application Ser. No. 10/667,203); U.S. Patent Application entitled "Field Oriented Pipeline Architecture for a Programmable Data Streaming Processor," Application Ser. No. 10/665,726); U.S. Patent Application entitled "Programmable Streaming Data Processor For Database Appliance Having Multiple Processing Unit Groups," application Ser. No. 10/668,113); and U.S. Patent Application entitled "Asymmetric Data Streaming Architecture Having Autonomous and Asynchronous Job Processing Unit," application Ser. No. 10/667,128), all of which are being filed together on the same date as this application. The entire teachings of each of these co-pending patent applications is also hereby incorporated by reference. This application and the above applications are also all assigned to Netezza Corporation.

BACKGROUND OF THE INVENTION

This invention relates to data processing systems that make use of multiple processing unit groups, and in particular to an asymmetric architecture that allows for autonomous and asynchronous operation of processing units and streaming of record data processing.

With continued development of low cost computing systems and proliferation of computer networks, the world continues to see an exponential growth in the amount and availability of information. Indeed, the Massachusetts-based Enterprise Storage Group has observed a doubling of information every few months. Demand for easy and efficient access to this ever-growing amount of digital information is another certainty. For example, World Wide Web traffic increased 300% in 2001 according to Forrester Research. Included among the applications that continue to make the greatest demands are systems for processing:

financial transactions data;
"click stream" data that encapsulates the behavior of visitors to web sites;
data relating to the operational status of public utilities such as electric power networks, communications networks, transportation systems and the like;
scientific data supporting drug discovery and space exploration.

Greg Papadopolous, the Chief Technical Officer of Sun Microsystems, Inc., has observed that the demand for access to decision support databases, referred to as the Input/Output (I/O) demand growth, doubles every nine months. To put this in context, Moore's Law predicts that Central Processing Unit (CPU) power doubles only about every 18 months. In other words, the demand for access to information is growing at least twice as fast the ability of a single CPU to process and deliver it.

In a typical general purpose data processing system, data is stored on one or more mass storage devices, such as hard disk drives. One or more computers are then programmed to read data from the disks and analyze it—the programs may include special database software written for this purpose. The problem with such a general purpose system architecture, however, is that all the data must be retrieved from the disk and placed in a computer's memory, prior to actually being able to perform any operations on it. If any portion of the data retrieved is not actually needed, the time spent fetching it is wasted. Valuable time is thus lost in the mere process of retrieving and storing unnecessary data.

The speed at which the data analysis can be performed is typically limited to the speed at which the entire set of data can be transferred into a computer's memory and then examined by the CPU(s). Usually, the aggregate data transfer rate of the disks does not govern the speed at which the analysis can be performed. Disks are inexpensive, and as such, data can be spread across a large number of disks arranged to be accessed in parallel. The effective data transfer rate of a set of disks, collectively, can therefore be almost arbitrarily fast.

The bandwidth of an interface or communications network between the disks and the CPUs is also typically less than the aggregate data transfer rate of the disks. The bottleneck is thus in the communications network or in the CPUs, but not in the disks themselves.

It has been recognized for some time that achieving adequate performance and scalability in the face of vast and rapidly growing data thus requires some kind of system architecture that employs multiple CPUs. The three most prevalent classes of so-called multiprocessing systems today include:

Symmetric Multiprocessing (SMP)
Asymmetric Multiprocessing (ASMP)
Massively Parallel Processing (MPP)

But even these approaches have weaknesses that limit their ability to efficiently process vast amounts of data.

SMP systems consist of several CPUs, each with their own memory cache. Resources such as memory and the I/O system are shared by and are equally accessible to each of the processors. The processors in an SMP system thus constitute a pool of computation resources on which the operating system can schedule "threads" of executing code for execution.

Two weaknesses of the SMP approach impair its performance and scalability when processing very large amounts of data. The first problem results from a limited ability to actually provide information to the processors. With this architecture, the I/O subsystem and the memory bus are shared among all processors, yet they have a limited bandwidth. Thus, when the volume of data is too high, the speed of the processors is wasted waiting for data to arrive. A second problem with the SMP approach is cache coherence. Within each processor is typically a cache memory for storing records so that they may be accessed faster. However, the more processors that are added to an SMP system, the more time that must be spent synchronizing all of the individual caches when changes are made to the database. In practice, it is rare for SMP machines to scale linearly beyond about 64 processors.

Asymmetric Multiprocessing (ASMP) systems assign specific tasks to specific processors, with a master processor controlling the system. This specialization has a number of benefits. Resources can be dedicated to specific tasks, avoiding the overhead of coordinating shared access. Scheduling is also easier in an ASMP system, where there are fewer choices about which processor to assign to a task. ASMP systems thus tend to be more scalable than SMP systems. One basic problem with asymmetry is that it can result in one processor being overloaded while others sit idle.

Massively Parallel Processing (MPP) systems consist of very large numbers of processors that are loosely coupled. Each processor has its own memory and storage devices and runs its own operating system. Communication between the processors of an MPP system is accomplished by sending messages over network connections. With no shared resources, MPP systems require much less synchronization than SMP and ASMP systems.

One weakness of the MPP model is that communication among processors occurs by passing messages over a network connection, which is a much slower technique than communication through shared memory. If frequent inter-processor communication is required, then the advantages of parallelism are negated by communication latency. Another problem with the MPP approach is that traditional programming models do not map cleanly onto message passing architectures. Using approaches such as Common Object Request Broker Architecture (CORBA), which are designed to handle message passing, are considered awkward by some designers.

There have also been attempts over the years to use distributed processing approaches of various types. These began with proposals for "Database Machines" in the 1970s, for "Parallel Query Processing" in the 1980s, and for "Active Disks" and "Intelligent Disks" in the last five to ten years. These techniques typically place a programmable processor directly in a disk sub-assembly, or otherwise in a location that is tightly coupled to a specific drive. This approach pushes processing power down to the disks, and thus can be used to reduce the load on a host computer's CPU.

More recently, system architectures have been adopted for parallel execution of operations that originate as standard database language queries. For example, U.S. Pat. No. 6,507,834 issued to Kabra et al. uses a multi-processor architecture to process Structured Query Language (SQL) instructions in a publish/subscribe model such that new entries in a database are automatically processed when added. As explained in the Abstract of that patent, a first processor is used as a dispatcher to execute optimized queries, setup communication links between operators, and ensure that results are sent back to the application that originated the query. The dispatcher merges results of parallel execution to produce a single set of output tuples that is then returned to a calling procedure.

U.S. Pat. No. 6,339,772 issued to Klein et al. discloses an SQL compiler and executer that support a streaming mode of operation. Again, with this architecture, "parent" and "child" nodes are assigned to execute portions of a SQL execution tree. Memory queues are also disposed between the nodes to permit intermediate storage of requests and fetched records.

Finally, U.S. Pat. No. 6,542,886 issued to Chaudhuri et al. discloses a database server that sequentially samples records that originate from a data stream in a pipelined query tree such that the system can sample over a "join" of two tuples without prior materialization or computation of the complete join operation.

SUMMARY OF THE INVENTION

The present invention overcomes the problems and disadvantages of the prior art. In particular, the present invention provides a multi-group computer architecture in which multiple computers are connected by a network, with associated software, in a manner that allows a stream of data on a record basis (data record by data record) where the data is typically stored and/or accessed in ROLAP or MOLAP formats. Its possible uses include business intelligence and data warehousing applications that work against databases consisting of a very large amount of data.

In a preferred embodiment, the present invention is a data processing system formed of groups of processors, which have attributes that are optimized for their assigned functions. A first processor group includes one or more host computers, which are responsible for interfacing with applications and/or end users to obtain queries, for planning query execution, and for, optionally, processing certain parts of queries. The host computers may be SMP type machines. A second processor group comprises many streaming record-oriented processors called Job Processing Units (JPUs), typically arranged as an MPP structure. The JPUs typically carry out the bulk of the data processing required to implement the logic of a query.

Each of the host computers and JPUs have a respective memory, network interface and CPU. Also each of the host computers and JPUs form a respective node on a network for communication between and among each other and for processing streams of records from operator to operator across and within nodes of the network.

Functions of the host computers in the first group can be divided into a "Front End" and an "Execution Engine." The Front End is responsible for parsing queries, generating query execution plans, optimizing parallelizing execution plans, controlling transactions, sending requests for processing to the Execution Engine and receiving results of such requests from the Execution Engine.

The Execution Engine is responsible for scheduling the execution of jobs and other operations to run on the JPUs or locally within the Execution Engine itself, (such as sorting, grouping, and relational joining), and passing the jobs to the appropriate Job Processing Units (JPUs).

The JPUs typically include a general purpose microcomputer, local memory, one or more mass storage devices, and one or more network connections. The JPUs preferably use a multi-tasking operating system that permits multiple tasks to run at a given instant in time, in a priority-based demand scheduling environment.

The JPUs are responsible for:

receiving requests from the host computers in the form of jobs, retrieving data items from disk or other data sources, and otherwise performing data processing requested by the host computers, and other tasks such as local transaction processing, concurrency control and replication;

communicating results back to Execution Engines of the host computers; and occasionally communicating with other second processor group components (i.e., JPUs).

In a preferred embodiment, each of the JPU components is dedicated to processing a predetermined subset of a larger data set. This architectural limitation further permits each JPU to run jobs and/or portions of queries autonomously and asynchronously from jobs in process by other JPUs.

The architecture thus supports a programming model for JPUs based on jobs. A job is a portion of a larger query that can be processed to completion by the combination of a given JPU, based on (a) the information already locally and authoritatively available to the JPU, and/or (b) the information directly provided to the JPU as part of the job.

It is the case that many query execution plans require coordination such that certain jobs must be carried out in a specific sequence, which others may execute in parallel. A job dispatch component in the host may be thus used in some embodiments of the invention to enforce a requirement that certain jobs must be run in sequence. This can be implemented by issuing each job a job identifier 'tag'. A job listener component in the host then coordinates receiving job identifiers from multiple JPUs as jobs are completed. The job listener waits to receive a response from each JPU and its associated job identifier before reporting results of a particular job to the host(s), or otherwise taking further steps in a query plan that must be executed sequentially.

A JPU may also perform other activities for its associated data sets such as storage allocation and deallocation; insertion, deletion and retrieval of records; committing and rolling back transactional changes; mirroring; replication; compression and decompression. As a result, such functions and other administrative tasks can be carried out in a manner that is optimized for that particular JPU.

In one embodiment, each JPU also has a special purpose programmable processor, referred to herein as a Programmable Streaming Data Processor (PSDP). The PSDP acts as an interface between the CPU of a JPU and storage controller and/or the mass storage device. The PRSP is a processor that is distinct from the more general purpose CPU in each JPU. It is also distinct from the CPUs of the host computers in the first group.

The PSDP can be implemented as a Field Programmable Gate Array (FPGA), as in the preferred embodiment, or as an Application-Specific Integrated Circuit (ASIC), a fully-custom Application Specific Standard Product (ASSP), or even as discrete logic on a printed-circuit board. It can also be included in an integrated processor (i.e., a CPU that includes peripheral interface logic) on a single chip or in a single package, or it could be included with the circuitry of the mass storage device.

In addition to assisting the JPU in accessing data, by moving data back and forth between memory and the disk, the PSDP is specially programmable to also interpret data in a specific format as the data is read from the associated disk. The PSDP can thus also perform operations on the data in this specified format, so that, for example, certain operations may be performed on the data as it is read from or written to associated disks (storage devices). This enables a PSDP to perform portions of jobs on data directly as it is read off the disk, prior to the data ever being forwarded to the JPU CPU or main memory.

In an embodiment specifically adapted for processing of record-oriented data, data can be filtered by the PSDP as records and fields (which may be rows and columns, respectively) of a database, so that only certain fields from certain records are actually forwarded to be written into the associated JPU's main memory. Further many operations beyond simple filtering are possible to implement in the PSDP. For example, records with certain characteristics can be tagged as they are written in the JPU's main memory to indicate that such records are to be ignored in further processing or to indicate certain attributes of such records, such as if they are to be handled differently than other records in transactions.

While the invention is of use in processing field-oriented database records, it should be understood, that the system can also be used to advantage in processing many different types of data, including other field delimited data such as tables, indices, and views. The system is also advantageously used to process less structured data such as character strings, Binary Large Objects (BLOBS), graphics files and the like.

In further aspects of the invention, the JPUs are implemented as embedded components. Thus, they are not directly accessible to applications or end users of the system. This architectural limitation has several advantages, among them:

Changes are easily made to JPU functionality because of the inherent modularity of the system, without impacting end user interfaces, or requiring changes to application code;

Bugs in application code cannot cause data corruption, crashes, or affect the requests of other applications;

An application is not required to produce new code according to a new Application Programming Interface (API), and queries written in existing standard languages using existing (APIs) will run correctly.

The JPU components of the second group are intended to be used as embedded devices within the multi-group architecture. While the JPU responds to job requests by host components, it operates autonomously, under its own control, and is not directly controlled by any other component within the architecture.

Because the JPUs operate autonomously, it can react to local circumstances and state changes independently and quickly.

This architecture also relieves remote or host processors from the necessity of tracking the state of multiple JPUs and making remote decisions about local affairs which has further advantages of avoiding network communications that would otherwise be necessary to control the operation of the JPU;

issues of "stale" state, or the overhead of keeping state up to date, and coordination of control of the JPUs by multiple hosts, allowing increased scalability.

In accordance with one aspect of the present invention, each of the JPUs and the host computers form respective nodes on a network. The network enables the host computers and JPUs to communicate between and among each other. A plurality of software operators allow each node to process data in a record-by-record, streaming fashion in which (i) for each operator in a given sequence of operators, output of the operator is input to a respective succeeding operator, without necessarily materializing data, and (ii) data processing follows a data flow (or logical data path) and is based on readiness of a record. The logical data path is formed of (a) sequences of operators and (b) nodes for executing the same. "Readiness" of a record means that as soon as a subject record is ready it is passed for processing from one node location or operator to a next node location or operator of the logical data path. The flow of record data during data processing is thus substantially continuous so as to form a stream of record processing from operator to operator across and within nodes of the network.

The record data in the stream of record processing may exist in various states at various node locations in the logical data path. The node locations may include on disk storage, on a programmable streaming data processor (PSDP) of a JPU, within JPU memory, on the network, within host computer memory and within ODBC or other connection with the end user/application requestor. The various states of record data include reference pointers, records coming off disk, broadcast data, data packets and materialized network data packets.

Preferably only certain ones of the operators materialize data and do so as a set of records.

In other aspects, the JPU's CPU eliminates unnecessary data before the data is sent across the network. The JPUs separate the stream of record processing from source of the record data such that various input sources to the JPU's are permitted. The JPUs further preferably comprise a Network Listener component which awaits requests from other nodes in the network and which returns streams of record data as output. The JPUs may also comprise a Network Poster component which accepts streams of record data as input and which sends data to other nodes when its buffers are filled, when jobs are completed or upon an explicit request to do so. In one embodiment, the JPUs comprise a Storage Manager component whose API and implementation provide for storage and retrieval of record sets.

In a preferred embodiment, at least one of the host computers eliminates unnecessary information/record data before processing a next step of a subject query. Further the host computers may include a Plan Generator component that generates record data processing plans having operations which take an input stream of record data and produce streams of record data as output and which avoid intermediate materialization. In other embodiments, the host computers further include a Communication Layer API that accepts data records as input to a message sent to one or more other nodes. The host computers may also include: a Job Listener component for awaiting data from other nodes; and an API which provides streams of record data as output. Preferably, the host computers comprise a Host Event Handler (execution engine) component that manages execution of a query execution plan. The Host Event Handler receives partial result sets from JPUs through the Job Listener component. Alternatively, the Host Event Handler communicates to JPUs through a Communication Layer component to request partial result sets from the JPUs. The Host Event Handler requests partial result sets from JPU buffers in order to get, sort and process partial result sets held in the JPU buffers instead of waiting for a JPU to fill its buffer and send the data to a host computer.

In yet other embodiments, the host computers include a Loader component which operates in streaming fashion and performs multiple operations on each field value in turn while each field value is held in a host CPU cache. The Loader component performs operations including one or more of: parsing, error checking, transformation, distribution key value calculation, and saving the field value to internal network output frame buffers.

A number of advantages result from this multi-group architecture with streaming record processing.

For example, a preferred embodiment of the present invention splits record processing responsibilities "asymmetrically" across several processing elements: the PSDP processor, the general purpose CPU in the second group JPUs, and the SMP hosts in the first group.

Further, the usual need to first read records into a memory prior to performing any operations on them is avoided. When only a fraction of the available data is relevant, the prior art approach is inefficient because:

Memory must be allocated for unused information

Time is wasted copying unused information into memory

Time is wasted stepping around unused information

The invention avoids this problem, since the PSDP is capable of performing database field level filtering operations as records stream out of the mass storage device before they are committed to be stored into memory.

In a preferred embodiment, the PSDP can also be programmed to perform operations such as Boolean comparisons of record field values against either literal values or other record field values, or values held in registers of the processing element, and reject records that fail these Boolean comparisons before they are stored in memory. Of the records that pass the filtering conditions, the PSDP element can thus additionally filter out the subset of fields that are irrelevant to a particular query.

In addition to field level filtering, the PSDP also can perform other operations on records as they are read from mass storage. For example, the PSDP can be programmed to decompress records entering memory and to compress records being sent out of memory. It can be instructed to decrypt records entering memory or to encrypt records being sent out of memory. It can convert lower case fields to mixed or upper case. It can, in fact, be programmed to perform a myriad of other such operations. Because these operations occur as each record streams into memory, the PSDP offloads such tasks from the JPU's main CPU, freeing it for other useful work.

Other advantages result if the PSDP is programmed to perform simple Boolean operations, such as to compare field values of the record stream against values held in its local registers. This allows a limited class of join operations to be performed on records before they are stored in memory. For example, if the values of the fields being joined are limited in range (such as when a set of consecutive integers is used to represent each of the 50 United States), the presence or absence of a particular field value can be encoded as a bit within a sequence of bits, whose position within the sequence corresponds to the integer field value.

One advantage of this is that it allows field level filtering and more complex processing to proceed in parallel within the JPU, for additional performance benefit. A more important advantage is that this configuration of processors is most effective at reducing the amount of data (i.e., eliminating unnecessary data) that must flow through the system.

In essence, by using a PSDP that is dedicated to performing as much field level filtering as possible before records are stored into the JPU's memory, the JPU's CPU is thus free to perform as much record processing as possible before it must return records over the network (for aggregation with the results of other JPUs) into a final reply to the SMP host. Because moving vast amounts of data requires much overhead, it is advantageous to add a dedicated processing element that eliminates as much unnecessary data as possible before each step in the data movement pathway from input to final result.

The JPU/PSDP architecture, in effect, separates streaming record processing from the source of the record stream. Thus, when the source of a record stream is a disk, the JPU/PSDP communicates with the disk through an industry standard disk interface. When the source of a record stream is a network, the PSDP communicates with the network through an industry standard network interface. This provides the advantage of modularity, and allows advances in the performance of disks or networks to be used directly by the JPUs without hardware redesign.

Because the PSDP can be programmed to recognize record formats, it is capable of producing record sets as an output. As a result, whenever the data is materialized within the system, it can always be stored in record sets. This permits very fast handling procedures to be implemented because a consuming operation never has to process a block of undifferentiated binary data.

Additionally, since there can now be one common data handling paradigm throughout the system, i.e., the streaming records, all functions such as storage, network, data operations and transaction operations can efficiently and consistently use the record model. Therefore, any operation may be arranged to take as input(s) the stream(s) of record data output from any other operation. In particular, each operator accepts one or more streams of record data as inputs and produces a stream of record data as output. Also, a common set of algorithms may be used for all operations whether on the host(s) or JPUs.

This is in contrast to most database systems which may materialize data as blocks of binary information that need to be parsed by differing operations; which use different paradigms for network, storage and internal operations; and which are unable to stream efficiently because of those different paradigms.

An important advantage of using an asynchronous, autonomous job model for JPU execution is that JPUs can complete jobs without waiting for additional information from a host or another JPU. In essence, a job is a request that can be processed by a JPU to completion without waiting for additional information. This increases the potential throughput of requests through a JPU, and minimizes the scheduling/coordination overhead that would otherwise be required to suspend requests in the middle of their operation until additional information is supplied.

This also enables autonomous (i.e., independent) operation of the JPUs. Specifically, each JPU may have its own multi-tasking operating system with a scheduler that determines the particular job that each JPU is dedicated to doing at a particular time based upon its local conditions. For example, if a group of JPUs are collectively assigned a sequence of jobs by the host, individual JPUs are free to complete the sequence on their own data without coordinating with other JPUs, waiting for results from other JPUs, or otherwise being constrained in the timing of their completion. This frees individual JPU to then run other jobs that may even relate to other queries, while neighboring JPU's continue to process jobs from the first query.

In certain prior art MPP architectures, the parallel components operate synchronously, in lockstep. In such systems, a message is sent to all the parallel processors, instructing them to perform a function, such as a portion of a query. However, even if certain parallel processors finish a requested function quickly, such a system must still wait for the processor that performs the requested function most slowly to finish, before it can proceed with further work.

This is not a particular problem in applications such as digital signal processing or image processing, where an identical sequence of operations is to be executed on all elements of a data set at the same time. However, in database systems, operations such as scan and restrict typically select only a portion of a data set to be subjected to further operations.

In contrast to synchronous lock-step systems, in the present invention the JPU's process requests (jobs) asynchronously, autonomously and in streaming record fashion. Each JPU is thus free to process its jobs as quickly as it can, and return its results (partial or complete) to the requestor and proceed with processing a next job. In this sense, the invention system provides streaming record processing. At the record level of this quick, efficient job turnaround, there are streams of records (generally analogous to arrays or other collections of data except as applied to records) being processed throughout the system. Whenever a JPU requires other I/O, either locally or remotely, it can suspend the job until that I/O is complete. In the interim, the JPU is available to process a different job. This asynchronous approach allows more work to flow through a system consisting of many JPUs.

In summary, the advantages of a data processing system and method according to the present invention include:

Because the JPUs in the second group eliminate irrelevant information from the data stream, the SMP host computing elements spend less of their time dealing with cache synchronization, memory bus saturation and I/O bus saturation.

Because the computing elements in the second group are highly autonomous, less computation and less coordination time is required on the part of the host computers in the first group.

Because the computing elements in the second group "own" their data, there is no ambiguity in the computing elements in the first group as to where requests should be sent.

Because the components of the system are all capable of processing streaming data as record sets, it avoids the computation time and memory overhead expense of materializing and aggregate views of the data, at least during intermediate processing steps, until it is necessary to return a final result to the requesting user or application. Records stream from the disk at disk speed; they stream through the filtering processor into memory, and through job processing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A. System Level Architecture

1. First Group Components

The present invention is a data processing system having two "groups" of processing units, in which the individual components of each group are individual network "nodes" within the system. As will be explained in detail below, the present invention is directed to streaming records (or using streams of record data) for continuous flow processing, from operator to operator across and within nodes of the network, where (i) operators allow output from one operation as input into a succeeding operation, without necessarily materializing the record data being operated on, and (ii) data flow is based on readiness of a record such that as soon as a subject record is ready, respective record data (i.e. the subject record or a reference to it) is passed for processing by a next operator (in the same node or different/next node). A node may execute multiple operations on the subject record before processing the next record or record data. Toward that end, processors on the second group operate (a) asynchronously, with respect to each other or with respect to processors in the first group and (b) autonomously in the sense that they can complete assigned tasks without waiting for data from other computers.

Further each operator accepts one or more streams of records as input and produces a stream of records as output. Advantages of this aspect are made clearer below.

Figure 1:
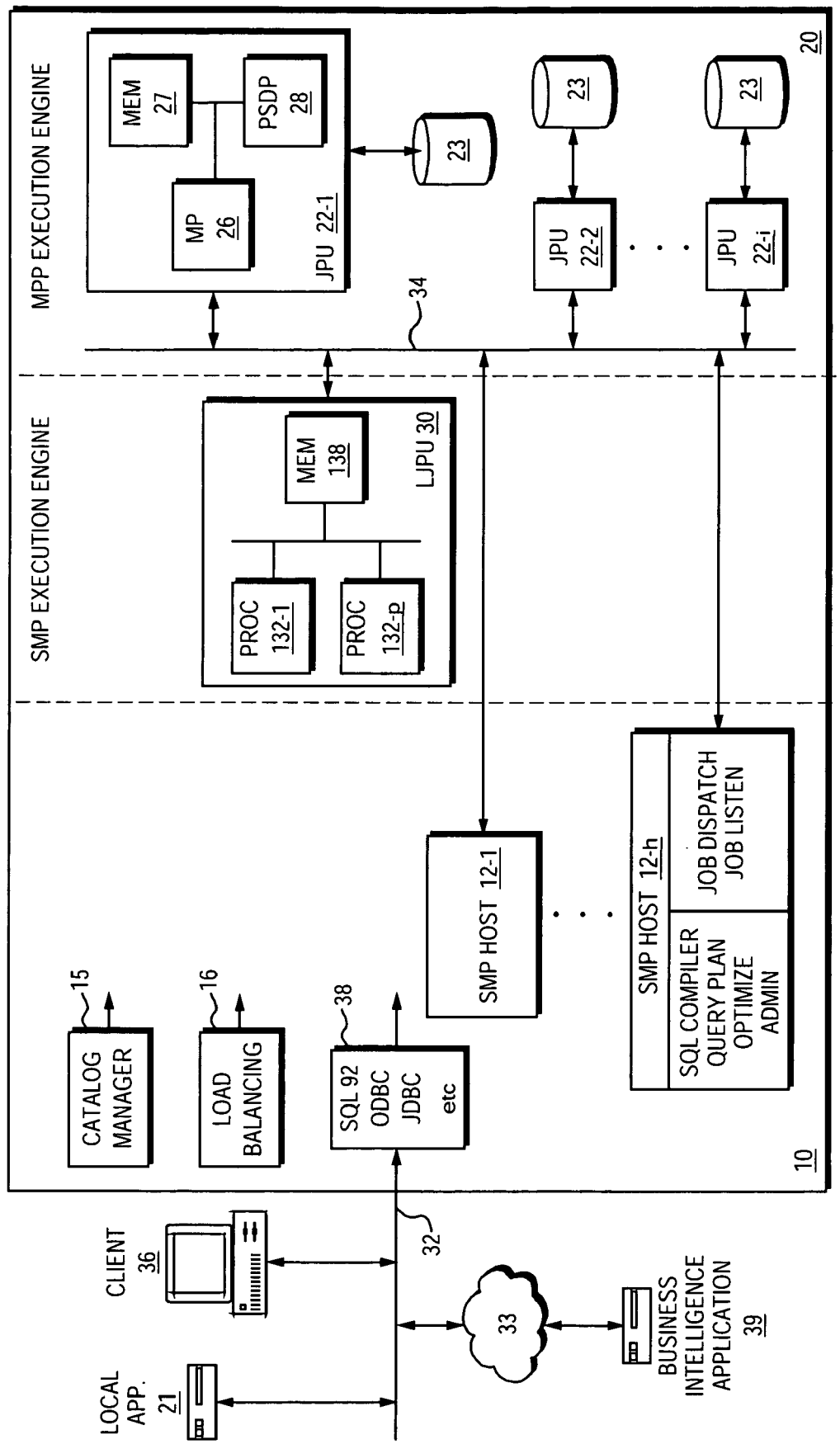
FIG. 1 is a system level block diagram of an asymmetric record processing system according to the present invention.

As more particularly shown in FIG. 1, the first group 10 consists of one or more SMP "host" computers 12-1, ..., 12-*h*, each with its own memory, network interface, and local storage (not shown in FIG. 1). Each host 12 runs its own operating system, and typically, but not necessarily, each host 12 uses the same type of operating system as the other hosts 12.

The hosts 12 typically accept queries that are requests for data stored on mass storage devices, such as hard disk drives 23. The requests may originate from any number of applications, typically business intelligence applications, that may be residing on local processors 21 or client computers 36 or separately running application software 39, that may originate through a computer network 33 or locally. Queries are typically provided in a format such as Structured Query Language (SQL), Open DataBase Connectivity (ODBC), Java DataBase Connectivity (JDBC), or the like.

The hosts 12 accept queries that can retrieve, modify, create and/or delete data stored on disk 23 and the schema for such data. The hosts 12 also accept requests to start, commit, and rollback transactions against the data. The hosts 12 also perform typical administrative functions such as reporting on the status of the system 10, start and shutdown operation, backing up the current state of the data, restoring previous states of the data, replicating the data, and performing maintenance operations.

Optionally, there is a load balancing function 16 in front of the host processors 12, which directs individual transactions to specific host or hosts 12 so as to evenly distribute workload.

A catalog management component contains descriptions of the fields and layout of data stored by the invention. Catalog management 15 also contains information about which users and applications have which permissions to operate in which ways on which types of records, datasets, and relations. The various hosts 12 interact with catalog management 15 in order to process the requests they receive. In one embodiment, catalog management 15 is embedded within one of the hosts 12, with parts replicated to the other hosts 12 and second group 20 components. As will be understood shortly, the catalog manager is used to provide information to permit the components of the second group 20 to perform filtering functions.

With the exception of their need to consult catalog management 15, the hosts 12 are generally able to respond to requests without having to communicate among themselves. In very rare instances, inter-host 12 communication may occur to resolve a transaction sequencing issue.

2. Second Group Components

Figure 2:
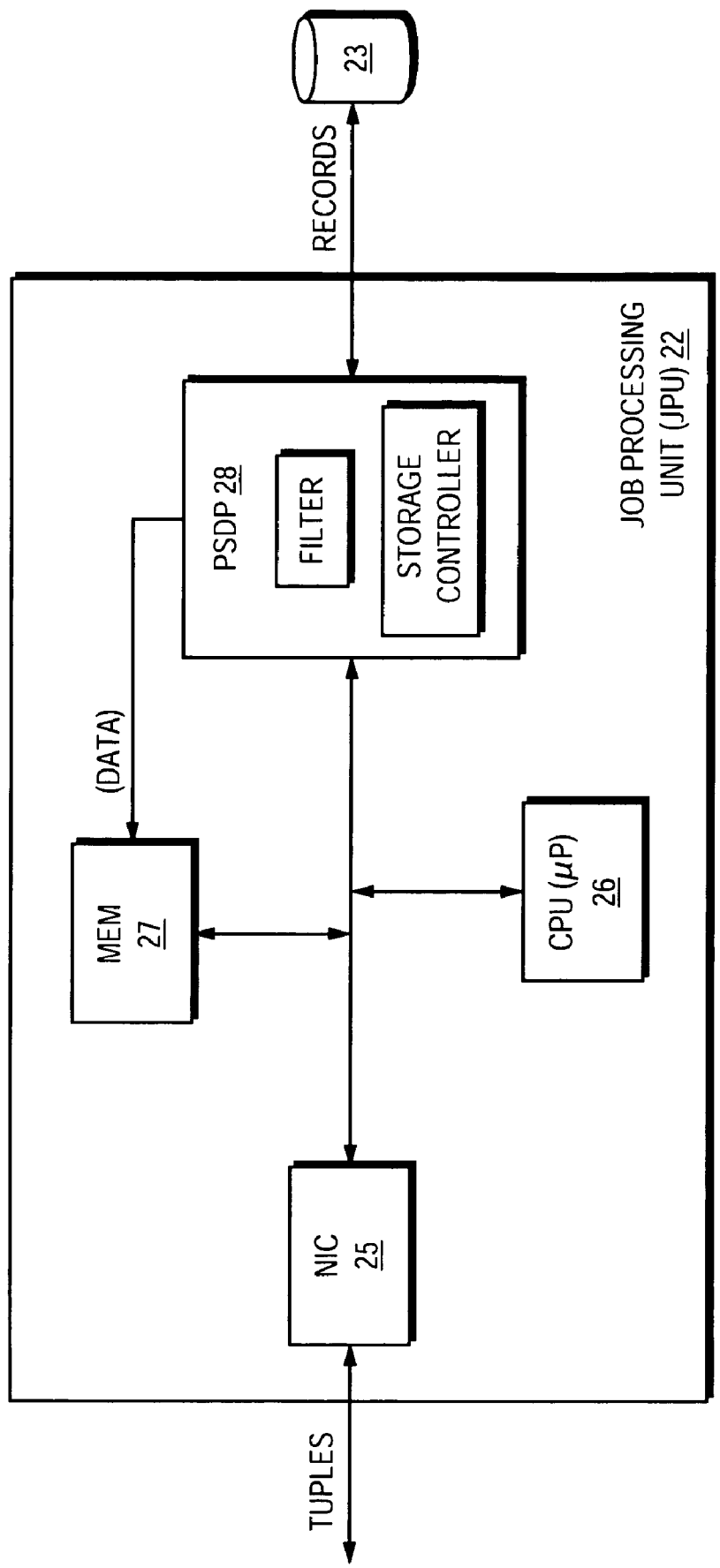
FIG. 2 is a more detailed view of a Job Processing Unit (JPU).

The second group of processors 20 consists of a plurality of Job Processing Units (JPUs) 22. As shown in more detail in FIG. 2, each JPU 22 includes a network interface 25 for receiving requests and delivering replies, a general purpose Central Processing Unit (CPU) 26 such as a microprocessor 26 corresponding memory 27 and a Programmable Streaming Data Processor (PSDP) 28. Each JPU 22 runs a multi-threading task-schedule based operating system. Each JPU 22 also has an attached disk (storage device) 23 and disk controller from which the JPU 22 may read streaming data. In other embodiments, the JPU can receive streaming record data from alternate or additional sources such as other on-board processors or via other network interfaces in place of the disk drives 23. Such streaming data might include stock quotes, satellite data, patient vital signs, and other kinds of "live-feed" information available via a network connection.

In some embodiments, JPU memory 27 is relatively smaller than host 12 memory. Thus, processor memory is a precious resource. As such the present invention advantageously provides (i) data processing of record data in a continuum or streams, and (ii) a flow of data (or pipeline or overall logical data path) from storage disk 23 to PSDP 28, to JPU memory 27, to JPU CPU 26, to internal network 34, to host 12 memory, to host CPU, to an output buffer (to enduser/client computers or applications 21, 36, 39). Such streaming of record data and data flow/pipeline provide improved data processing heretofore unachieved by the prior art as will become apparent by the following description.

The JPU 22 accepts and responds to requests from host computers 12 in the first group 10 to process the streaming record-oriented data under its control. These requests are typically "jobs" of a larger query, and are expressed as sequences of primitive operations on an input stream. The primitive operations could be interpreted, but in the preferred embodiment, they are packaged as compiled code that is ready for execution. An exemplary job-based query is described in more detail below.

In addition to processing jobs, a JPU 22 also accepts and responds to requests from host computers 12 for other operations such as:

Start, pre-commit, commit, abort, and recover transactions
Perform mirroring or other replication operations
Start, initialize, reinitialize, stop, and retrieve status information
Create, modify, or delete descriptions of records, indices, views and other metadata Each JPU 22 also accepts and responds to requests from the hosts 12 to:

Perform mirroring or other replication operations
Redistribute data from one JPU to another
Send data local to one JPU to another JPU to help process a query job
Send data to a logging device
Send data to a replication device
Acknowledge the successful completion of an operation requested by another node.

JPU(s) 22 typically use a multi-tasking Operating System (OS) to allow receiving, processing, and reporting the results from multiple jobs in a job queue. In the preferred embodiment, the OS should also support overlapping job execution. To coordinate this, the OS typically is responsible scheduling and prioritizing requests according to a number of factors that are determined in real time. These may include a job priority as assigned by the user and/or host 12, as well as a job's expected impact on the JPU's 22 local resources includes the amount of memory, disk, network, and/or I/O queues needed to complete the job. The JPU 22 can also contain software for performing concurrency control, transaction management, recovery and replication of data for which the JPU is responsible.

In the preferred embodiment, JPUs 22 in the second group 20 are not directly visible or accessible to the users of, or the applications that run on, for example, the external clients that present queries to the system 10. The JPUs are an embedded component and maintain significant autonomy and control over their data. A given record (or other data primitive) in the system 10 is thus normally directly accessible to, and processed by only one JPU 22. While JPUs may replicate their records to increase reliability or performance, they do not share responsibility for processing a given record with other JPUs 22 when carrying at ajob as part of a query.

3. Third Group Components

The system architecture exhibits further aspects of asymmetry in that one or more so-called Large Job Processing Units (LJPUs) 30 can also play a part in processing queries. Each LJPU 30 consists of a network interface for receiving job requests and delivering replies, and one or more general purpose Central Processing Units (CPUs) 132-1, . . . , 132-p (each of which may have their own internal memory), as well as a shared memory 138. The CPUs 132 in the LJPUs 30 preferably represent a relatively powerful computing resources, consisting of a relatively high speed processor that has access to relatively large amounts of memory. The LJPUs may be organized as an SMP that share portions of memory 138.

LJPUs are employed to carry out jobs that are not otherwise suitable or possible to perform on the JPUs, such as operations that must be performed on large materialized data sets. This may include sorting, grouping, relational joining and other functions on filtered data, that might not otherwise be possible on a given JPU.

The LJPUs also preferably play an important role in other functions. One such function is to serve as an Execution Engine which assists the hosts 12 with coordinating the results from the many jobs that may be running autonomously and asynchronously in the JPUs 22.

LJPU(s) 30 may also typically use a multi-tasking Operating System (OS) to allow receiving, processing, and reporting the results from multiple jobs in a job queue. In the preferred embodiment, the OS should also support overlapping job execution. To coordinate this, the OS typically is responsible for scheduling and prioritizing requests according to a number of factors that are determined in real time.

Throughout the invention system, the components and subcomponents are designed to optimize performance thru extensive use of streaming operations coupled with record (or generally tuple set) operations. As will be understood shortly most operations are designed to take record data or groups of record data (e.g., tuple sets) as their input and output streams; these operations try not to materialize data, but instead they stream the output to the next operation. As a consequence many operations in sequence or series can be handled as one continuous data flow, whereas in a conventional system, it would be necessary to handle them in various layers.

For instance, a storage layer can be designed as a record set manager where (from the view of other JPU processes) it stores and retrieves records or sets thereof. From the storage layer onward, data is normally handled in records, providing a consistent, well organized, and easily accessible format for internal operations. This is in contrast to other systems where the storage layer stores and retrieves undifferentiated blocks of data which are later converted to tuple sets by some other downstream process. Another example of the streaming/record architecture is the network layer, which sends and receives records instead of blocks of data.

Yet another example is a merge aggregation node, where a sorted data stream is aggregated as requested, and whenever a new key index value is received, the aggregation from the previous key index value may be streamed to the next node.

A streaming/record operation can be illustrated by tracking a typical dataflow during a load operation. In this example load case, as data is read into a host 12 over TCP/IP network connection 32, that data is parsed, error-checked, and transformed, and the distribution value calculated, all while the specific byte/field is in processor cache, and saved to the internal network output frame buffers as one step. The result is that the input data is read/transformed in a streaming fashion and converted to network-ready record packets at streaming speed with minimal overhead. As each packet is received, it is sent over the internal network 34 to an appropriate JPU 22 (as determined by the a distribution value in a Query Plan). At the JPU 22, the received data is read, converted into an approved storage format, and placed in memory buffers on a record-by-record basis. As memory buffers are filled, a storage layer in the JPU double-checks that the data corresponds to the indicated table, and that the table "owns" the physical space on the disk 23, and then writes that data to the disk 23. Note that during this process, a given byte of data was "touched" only a few times, and that the data was manipulated in records (i.e., on a record basis) thereby optimizing performance and reliability.

A second illustration of a streaming record operation is a join/aggregate operation where three joins and one co-located aggregation are performed on JPUs 22, and the results are returned through the host 12 via ODBC connection 38 to the ODBC client 36 (e.g., Business Objects).

In this example, on each of three JPUs, the disk 23 is scanned and data read off the disk through the associated PSDP 28, which filters records of interest and fields of interest within those records, and places the resulting records into a record set buffer in JPU memory. As each record set buffer is filled, that record set is passed through each of three JPU join nodes and the aggregate node in turn. Each time a new key value is received by the aggregate node, the previous aggregate value and associated key value record are transformed as necessary per the ODBC request, and placed in the JPU network packet output buffer associated with the requesting host 12. When a network packet output buffer in the JPU is filled, its contents are sent to the host 12, where it is immediately placed in the user-side network buffer and is immediately sent to the ODBC client 36.

Note that, as in the previous example, the data was "touched" only a few times. Because the data was handled in records (i.e., record-by-record basis in the input stream of records), it could be operated on as integral units with very minimal overhead. Because the operations are extremely integrated, mixed operations such as joins, aggregates, output transformation, and network packet creation are all performed while the data is in processor cache memory.

B. Host Software Functions

Figure 3:
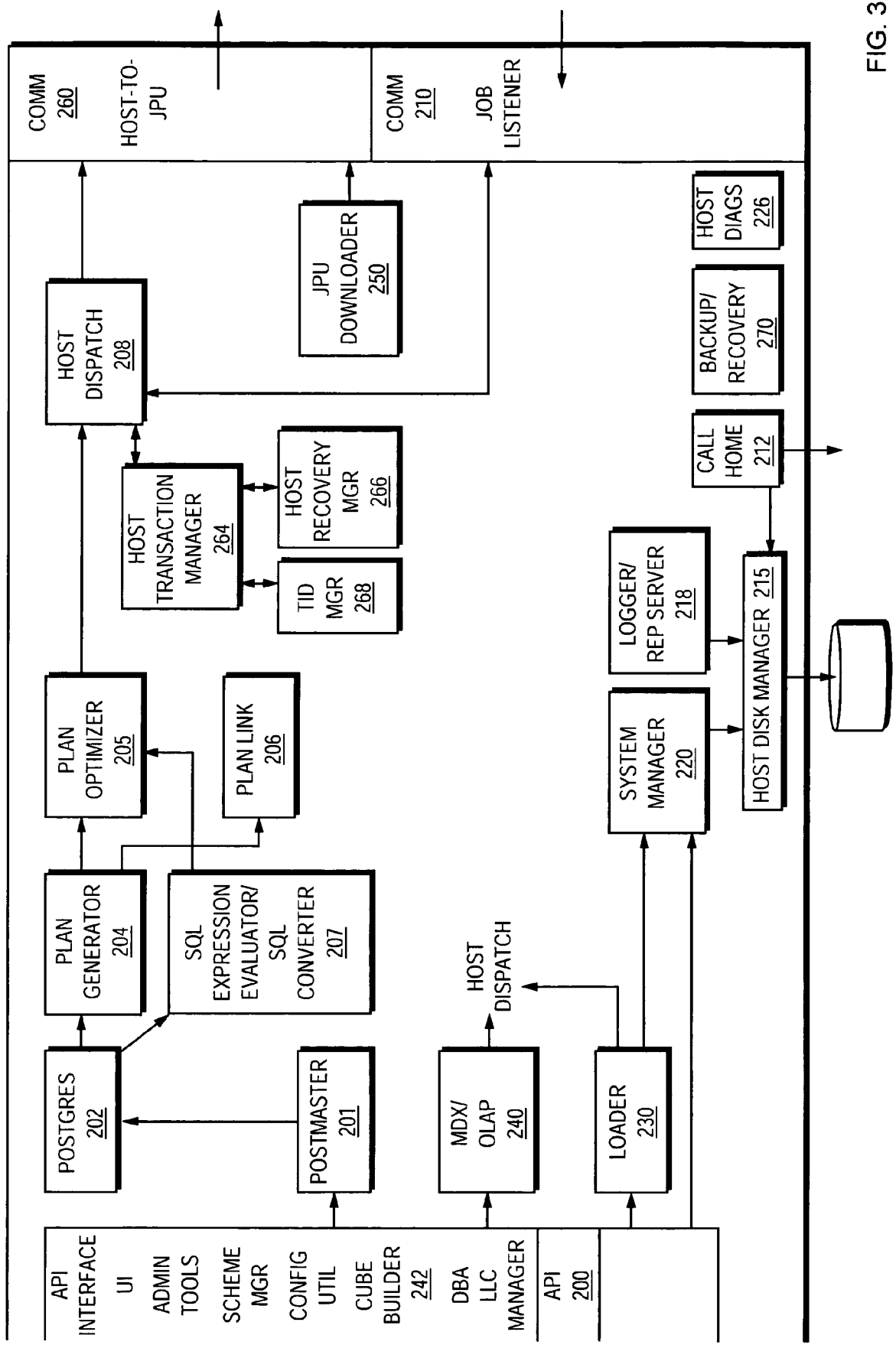
FIG. 3 is a detailed view of software components in a host.

FIG. 3 is a software component diagram for a host processor 12. A summary description of the functional blocks and their interactions now follows. This list is intended here to be an introduction to a more detailed description of how a query is processed into a set of jobs that can then be carried out asynchronously and autonomously by JPUs 22.

Postmaster 201/Postgres 202
Serves as Front-end for query processing
Postmaster 201 accepts requests from user applications via API 200
Creates an Execution Plan
May use authentication
Plan Generator 204
Parse/query rewrite/planner—plans how query will be processed.
Supports SQL-92 DDL/DML
Supports SQL Functions
Provides compatibility with Oracle, SQL Server
Integrated with SQL triggers, stored procedures
Plan Optimizer 205
Cost-based optimizer, with the addition of locale costs which optimizes for most efficient operation/highest level performance
Indicates which operations will be done within host and which will be done within JPU
Communicates with Plan Link, providing tips on what filtering should be done within the Programmable Streaming Data Processing ("PSDP") 28 if there are multiple filters that can be done there (more than the PSDP can handle)

Maintains usage/reference statistics for later index creation, refreshing cluster indices Plan Link 206

Takes an Execution Plan as input

Analyzes Execution Plan and splits plan further, identifying what will be done within the PSDP 28, what will be done within the JPU 22 after the PSDP 28 has returned its data to the JPU 22, and what will be done in the Host 12 after the JPU 22 has returned its data SQL Expression Evaluator/SQL Converter 207

Expression Evaluator

Creates object code for evaluating given expression to be executed on the Host, JPU, and PSDP based on the expressions, their type, and the capabilities of the installed hardware Host Dispatch 208

Similar to standard UNIX scheduler/dispatcher

Queues execution plan and prioritizes based on (a) the plan's priority, history, and expected resource requirements, and (b) available resources and other plans' requirements Controls number of jobs being sent to any one JPU 22 or LJPU 30 to avoid JPU/LJPU Scheduler or JPU/LJPU memory overload Sends Host jobs to host Sends JPUs jobs to be monitored to the Execution Engine 360 in the LJPU.

Call Home 212

Initiates message to a Technical Assistance Center (not shown) to identify failed part and trigger service call or delivery of replacement component (as appropriate given user support level)

Optionally communicates via SNMP to a defined app to receive a failure indicator and callhome trigger Logs error(s)

Logger/Replication Server 218

Logs transaction plans, messages, failures, etc. to Netezza log in conventional fashion Implemented as a standard transaction logger/replication server System Manager 220

Defines and maintains JPU/LJPU Configuration information, striping information

Mirror Master—maintains mirrors info—what JPUs are being mirrored where, maintains SPA data, maintains info on system spares Initiates failover processing when informed by Comm layer of a non-communicative JPU—directs mirror of failed JPU to take over as primary and begin copying to designated spare, directs primary of JPU mirrored on failed JPU to copy its data to that same designated spare, to reduce load on mirror of original failed JPU also directs mirror of the primary on that failed JPU's mirror to do double duty and act as new primary until failover copying has been completed Communicates to callhome component to initiate replacement process Manages system expansion and allows for redistribution of data as appropriate or as requested by user during expansion Initiates JPU/LJPU diagnostics when appropriate Provides an API to allow client management interface to get configuration data for user display/control Host Diags 226

Runs diagnostics on Host as required/requested

Loader 230

Provides fast loader capability for loading user data onto disks

Communicates directly to Host Dispatch to load database/insert records

Communicates with System Manager to get configuration and mirroring data

Controls index creation on primary (and sets up job to run later to create indices on mirror)

Supports input via a number of methods (e.g., tab-separated data, backup/recovery)

Does ETL, converts data from Oracle, SQL Server, DB/2, etc. to the internal data format

MDX/OLAP 240

Provides OLAP/MDX, ROLAP Engine on Host

Creates and maintains MOLAP cubes

Supports multi-user MDX

Creates Execution Plans for OLAP requests and communicates these directly to Host Dispatch Supports metadata writeback Provides administrative support for user creation, security Access System Catalog through API Cube Builder User Interface (UI) 242

Provides interface for defining and managing cubes to be used in OLAP Processing JPU Downloader 250

Downloads Firmware to System JPUs 22 at system initiation/boot

Downloads PSDP 28 and JPU 22 images

Communicates with System Manager to understand number of JPUs and

JPU Configurations

Initializes spares for failover

Initializes replacements

Host Disk Manager 215

Manages Host Disk (used for Catalog, Temp Tables, Transaction Log, Other Log, Swap space)

Host Transaction Manager 264

Manages transactions on the host 12

Controls requests sent to JPUs 22 that will be involved in the transaction

Provides lock management and deadlock detection

Initiates abort processing

Sends state data to Recovery Manager 266

Sends ID requests to the Transaction I.D.(TID) Manager 268

Provides transaction IDs and deleted transaction IDs to ensure that disk records are preceded Manages catalog requests as transaction requests as required TID Manager 268

Provides unique transaction identifiers (TIDs)

Coordinates with other hosts to avoid generating duplicate TIDs

Host Recovery Manager 266

Ensures transaction atomicity after component (e.g., JPU) failure

Maintains journal of transaction state

Initiates rollback as required

Backup/Recovery 270

Supports Host side of Backup/Recovery process

Interfaces with Transaction Manager and JPU Storage Manager

C. JPU Software Components

Figure 4A:
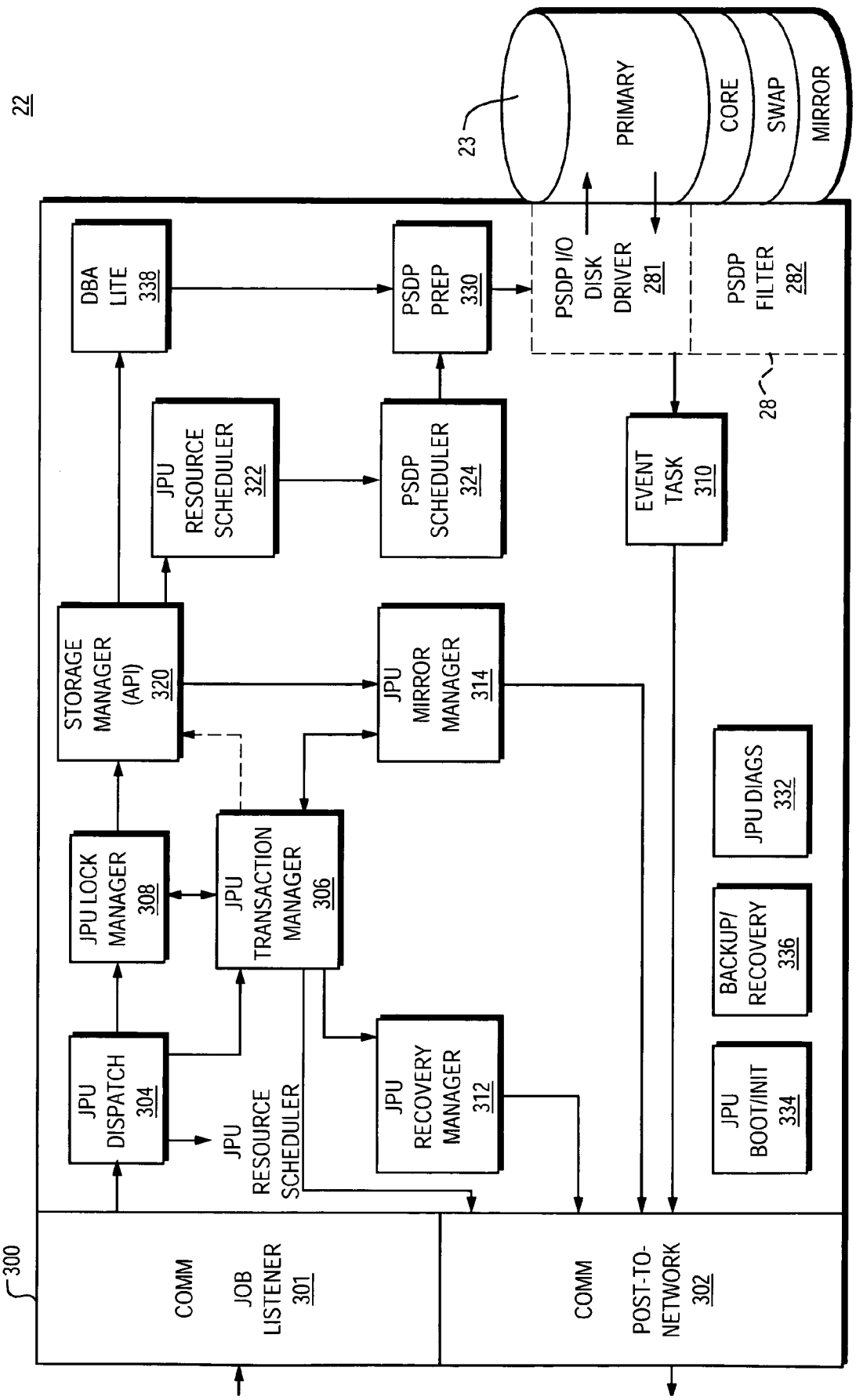
FIG. 4A is a detailed view of Job Processing Unit (JPU) software components.

FIG. 4A is a diagram of the software components of a JPU 22.

Figure 4B:
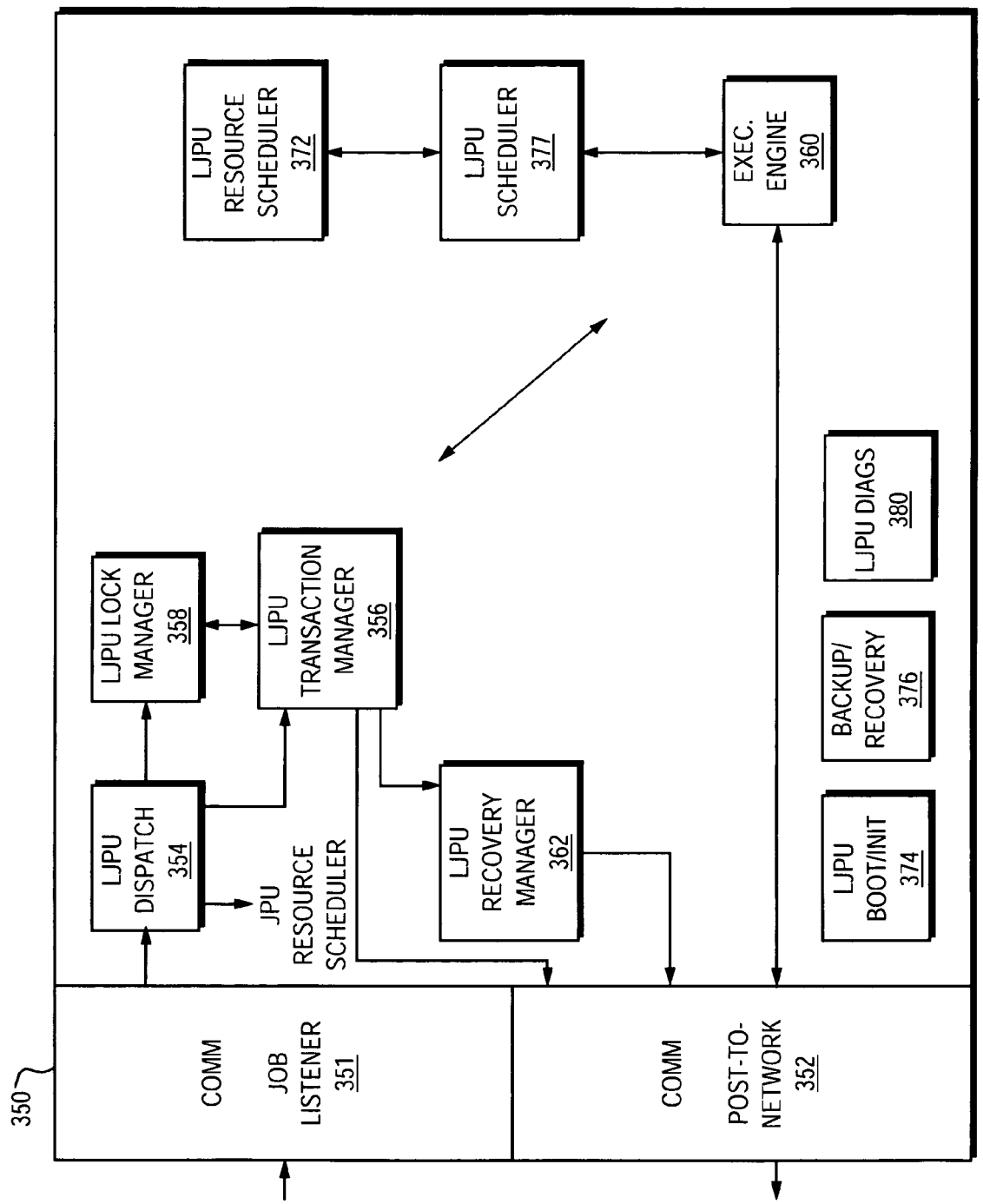
FIG. 4B is a detailed view of Large Job Processing Unit (LJPU) software components.

Communications Layer 300
Provides internal communication among nodes
Includes Job Listener 301 to await requests
Includes Network Poster 302 to send data when buffer filled, job completed, or at Host request
JPU Dispatch/Scheduler 304
Receives plan through Communications Layer 300
Queues Plan
Schedules/dispatches jobs according to their priority, "fairness" to date, expected resource requirements, and available resources
JPU Transaction Manager 306
Processes changes in transaction state to begin a transaction, pre-commit a transaction, commit a transaction, or abort a transaction
Handles processing of dependencies among transactions as flagged by the lock manager; broadcasts information about these dependencies to relevant host(s); initiates deadlock checks
JPU Lock Manager 308
Controls concurrent access to data
Interfaces with EventTask 310 before a query is executed and for each result set returned from a scan
Provides support for arithmetic locking
JPU Recovery Manager 312
Maintains a Journal to track transaction status on the JPU 22, using the Storage Manager API
Performs transaction recovery when requested by JPU Transaction Manager
JPU Mirror Manager 314
Mirror Sender receives copies of record updates from Storage Manager 320 and transmits these to the mirror for this JPU when an updating transaction commits
Mirror Receiver receives record updates, buffers these in memory, and flushes out to disk through the Storage Manager when the Mirror Receiver buffer is full
Transmits all data to a spare system during failover processing
Storage Manager 320
Stores and manages information on disk in optimal fashion
Has an API that supports storage and retrieval of records (or tuple sets)
Supports error checking to insure that the data conforms to the indicated table and the indicated table "owns" the physical space to which the data is being written
Supports creation and deletion of tables, views, and indices
Handles record inserts and deletes
Supports ETL and mass loading of existing user data among various JPUs
Provides storage support for commit/rollback
Provides support for Precise Indexes
Provides mirroring support for failover
Optimizes sort operations and utilizes smart hash algorithm for data distribution/striping
Provides support for compression and smart storage optimization
Controls disk I/O
JPU Resource Scheduler 322
Schedules jobs to run on the PSDP 28; communicates with JPU/PSDP Scheduler 324 to queue up PSDP requests to retrieve required data
Optimizes the queue to keep the PSDP/disk as busy as possible, with requests from multiple queries intermixed in the queue based on disk characteristics and location of data on the disk
Takes into account the needs of any data loading for new tables being created and transformed to internal data format (i.e., to optimize the loading process)
Supports heuristic-based scheduling, ensuring that jobs are scheduled on a priority basis, but also ensuring that all jobs do get serviced (e.g., raising a job in priority if it has not been run in a certain interval of time)
Supports synchronous/piggy-backed scans, combining similar requests to optimize PSDP processing
Manages memory buffers/memory allocation on JPU; allocates memory to Execution Plans based on expected needs and hints received from Plan Optimizer
JPU Paging (if required)
PSDP Prep 330
Defines the instructions that will be given to the PSDP 28 in order to process a request (instructions tell the PSDP 28 what to do with each field being read from the disk)
Identifies what filtering, transformation, projection, and aggregation operations are to by run by the PSDP 28
EventTask 310
Executes the portion of the Execution Plan that could not be handled by the PSDP but that does not have to be handled at the Host level
Handles sorts, joins, transformations, and aggregations that could not be done as data stream through the PSDP 28
Maintains a memory buffer of result set records and returns these to Host through the Comm Layer when buffer filled, job completed, or at Host request
JPU Diags 332
Runs diagnostics on JPU as required/requested
JPU Boot/Init 334
Executes image burned into flash memory at boot time to bootstrap the JPU, run diagnostics, register the JPU with the primary Host server, and download new image from Host to run
Loads and transfers control to the image downloaded from the primary Host server to load the JPU application code, the operating system, the network stack, and disk driver code
Backup/Recovery 336
Supports JPU side of Backup/Recovery process
Interfaces with Transaction Manager and JPU Storage Manager
DBA Lite 338
Provides automatic and dynamic disk and Storage Manager support
Supports dynamic index creation, defragging, index garbage collection, timers, agents
JPU/PSDP Scheduler 324
Schedules jobs to run on the PSDP; queues up PSDP requests to retrieve required data D. LJPU Software Components FIG. 4B is a diagram of the software components of a Large JPU (LJPU) 30; the components are in general a subset of those found in the JPUs 22. Since the LJPUs are not typically responsible for managing data on the disks 23, components such as storage manager and mirror manager are not needed. If LJPUs exist in the system, they do have a special additional Execution Engine 360 component that is not found in the JPUs 22. However, If LJPUs are not present in the system, the Execution Engine 360 component can reside in the host 12.

LJPU Communications Layer 350
Provides internal communication among nodes
Includes Job Listener 351 to await requests
Includes Network Poster 352 to send data when buffer filled, job completed, or at Host request
LJPU Dispatch/Scheduler 354
Receives plan through Communications Layer 350
Queues Plan
Can schedules/dispatch jobs according to their priority, "fairness" to date, expected resource requirements, and available resources
LJPU Transaction Manager 356
Processes changes in transaction state to begin a transaction, pre-commit a transaction, commit a transaction, or abort a transaction
Handles processing of dependencies among transactions as flagged by the lock manager; broadcasts information about these dependencies to relevant host(s); initiates deadlock checks
LJPU Lock Manager 358
Controls concurrent access to data
Provides support for arithmetic locking
LJPU Recovery Manager 362
Maintains a Journal to track transaction status on the LJPU 30, using the Storage Manager API
Performs transaction recovery when requested by LJPU Transaction Manager 356
LJPU Resource Scheduler 372
Schedules jobs to run on the LJPU
LJPU Diags 380
Runs diagnostics on JPU as required/requested
LJPU Boot/Init 374
Executes image burned into flash memory at boot time to bootstrap the LJPU, run diagnostics, register the LJPU with the primary Host server, and download new image from Host to run
Loads and transfers control to the image downloaded from the primary Host server to load the LJPU application code, the operating system, the network stack, and disk driver code
LJPU Backup/Recovery 376
Supports LJPU side of Backup/Recovery process
Interfaces with LJPU Transaction Manager
LJPU Scheduler 377
Schedules jobs to run on the LJPU
Execution Engine 360
Receives partial record sets from JPUs 22 through the Comm Layer Job Listener
Executes remainder of Execution Plan that has to be done at LJPU
Provides intermediate and final sort-merge of JPU 22 results sorted data as required
Handles joins of data returned from JPUs 22 as required
Communicates to JPUs through Comm Layer 350 to request partial result sets from JPU buffers when idle (e.g., to get and sort/process partial records that the JPU currently has instead of waiting for JPU 22 to fill a buffer E. Details of PSDP Component 280F the JPUS 22

As discussed above, the PSDP 28 functions as the disk drive controller and as a coprocessor or hardware accelerator for the JPU 22 to which it is attached. During DMA disk read operations, the PSDP 28 filters the data it is reading. More specifically, it parses the disk data to identify block, record, and field boundaries. Fields can thus be transformed and compared with data from other fields or with constants, right in the PSDP 28, and prior to storing any data within the JPU memory or processing any data with the JPU CPU 26. The comparisons are combined to determine if a record is wanted, and if so, selected header and data fields are formatted and returned to JPU memory. If a record is not wanted, the PSDP ignores it and proceeds to the next record. The PSDP 28 thus performs two major functions: as a disk driver logic interface 281 and tuple (record set) filter 282.

Each of these functions is described in some detail below. It is sufficient here to note that the disk driver logic interface 281 accepts standard disk drive interface signaling, such as IDE (Integrated Device Electronics) or SCSI (Small Computer Systems Interface), adapting it to a particular CPU native "bus" such as a Advanced Technology Attachment (ATA) bus or the like. Alternatively, if there is a communications network, such as Ethernet or Fibrechannel, instead of an array of disks 23 to provide access to input data stream(s), the interface 281 becomes a network interface that is suitable to receive and/or transmit data over a communications network. The disk driver logic 281 is usually implemented in an Integrated Circuit (IC) in a computer or communications device, in or part of an IC that contains other logic, such as other interface logic or the CPU 26 itself. The disk driver 281 could even be inside the disk 23 itself, making the disk a special-purpose unit attachable only to JPUs or communications devices for which the interface is specific.

In the preferred embodiment, the PSDP 28 is an IC that interfaces a standard disk 23 to a peripheral bus of the JPU 22. All such controllers have the basic function of allowing the CPU 26 in the JPU 22 to read and write the disk 23, typically by setting up long data transfers between contiguous regions on the disk and contiguous regions in the CPU's 26 memory (a process usually referred to as DMA, for Direct Memory Access).

Most importantly, the PSDP 28 also provides programmable hardware directly in the disk read path, to and from the controller. This portion of the PSDP hardware, called a "filter" unit 282, can be programmed by the JPU's CPU 26 to understand the structure of the data that the analysis software running on the CPU 26 wishes to read and analyze. The PSDP 28 can thus be programmed to operate on data it received from the disk 23, before the data is stored into the CPU's memory. In turn, the PSDP 28 as programmed discards fields of data and entire records of data that the CPU 26 would have to analyze and discard in the absence of the filter unit 282.

In an embodiment specifically adapted for processing of record-oriented data, data can be filtered by the PSDP 28 as records and fields of a database, so that only certain fields from certain records are actually forwarded to be written into the associated JPU's main memory. However, many other operations beyond simple filtering are possible to implement in the PSDP. For example, records with certain characteristics can be tagged as they are processed, to indicate that such records are to be ignored in further processing, or to indicate certain attributes of such records, such as if they are to be handled differently in a transactions from other records.

Although referred to here as a "filter" unit, it should be understood that filter 282 can also perform other functions such as compression/decompression; encryption/decryption; certain job operations; and other administrative functions.

As one example of filtering, the PSDP 28 can be programmed to recognize that a certain set of records in a database has a specified format, for example, a preamble or "header" of determined length and format, perhaps a field, including the length of the record, followed by data including some number of fields of a certain type and length (e.g., 4-byte integers), followed by some number of fields of a different type and length (e.g., 12-byte character strings), followed by some number of fields of variable length, whose first few bytes specify the length of the field in some agreed-upon manner, and so forth.

The filter unit 281 can then execute this program as it reads data from the disk 23, locate record and field boundaries, and even employ further appropriate Boolean logic or arithmetic methods to compare fields with one another or with literal values. This allows the filter unit 282 to determine precisely which data fields of which records are worth transferring to memory. The remaining records of data are discarded, or tagged in a manner that signals to the JPU that a record need not be analyzed. Again, there will be more discussion of how this is done in detail below.

In the preferred embodiment, there are two basic reasons for which the filter unit 282 can discard a record (or mark it as unworthy of attention). The first is an analysis of the contents of the fields as described above. For example in response to the query "show me the total units and dollar amounts of rain gear sold to females in North Caroling in year 1999, by customer ID", the filter unit 282 can be programmed to check a purchase date field against a range of numbers that correspond to dates in the month of July in the year 1999, another field for a number or string (identifier) uniquely associated with the North Carolina store, another field for a set of SKU (stock-keeping unit) values belonging to various styles or manufacturers of blue raincoats, and in this fashion mark only certain records of data for further processing. The filter unit 282 can further be programmed to know which data, fields contain the name and address of the customer who made the purchase, and return only these fields of data from the interesting records. Although other database software could perform these operations, the filter unit 282 can perform them at the same rate as the data is supplied by the disk 23. Far less data (especially unnecessary data) ends up in the JPU's memory as a result, leaving the CPU 26 free for more complex tasks such as sorting the resulting list of names and addresses by last name or by postal code.

A second example of how the filter unit 282 can be used to discard or mark a record, is in record creation and deletion in a multi-user environment. Databases are not static, and it is common for some users to be analyzing a database while others are updating it. To allow such users concurrent access to the database, records can be tagged with transaction numbers that indicate when or by whom a record was created or marked obsolete. A user querying a database may not wish to see records created by another user whose activity began subsequently, or whose activity began previously but is not yet complete; if so, he probably will want to see records marked obsolete by such a user. Or the user may wish to see only the results of transactions entered by certain users, or only the results of transactions not entered by certain users. To facilitate this kind of record filtering, record headers can contain creation and deletion identifiers that the filter unit 282 can be programmed to compare with the current user's identifier to determine whether records should be "visible" to the current user. Once again, the filter unit can avoid transferring useless data to JPU memory or relieve the CPU 26 of a time-consuming analysis task.

In the preferred embodiment there are two basic methods the filter 282 unit can use to save the communications network or the CPU from handling useless data. As described above, the filter unit 282 can simply discard the data. This is not always practical, however. Imagine a very long record with many data fields, or large fields, many of which are to be returned to the CPU if the record meets the criteria, arranged in such a way that the contents of the last field are relevant to the decision to transfer or discard the selected fields of the record. Practical implementations of the filter unit 282 may not be able to store ("buffer") the largest possible set of returnable fields of data. In such a case, the filter unit 282 must begin sending the data selected fields to the CPU 26 before it can tell whether they should be sent. After the record has been completely processed by the filter unit, and all the selected fields transferred to the CPU 26, the filter can tag the transferred data with a bit that says "never mind", thus saving the CPU 26 and the communications network a great deal of work. In practice, the filter unit must append a length indication to every record fragment it does transfer to the CPU 26, so that the CPU 26 can find the boundaries between the record fragments the filter unit 282 deposits in memory. This is a natural place for a status bit (or bits, if the CPU 26 must distinguish among multiple reasons) indicating the transfer of a useless record.

In addition to selecting certain fields from certain records for transfer to the CPU 26, the filter unit 282 can create and return additional fields not present on the database, by performing calculations on the contents of the fields that are present. This can further relieve the CPU 26 of work, speeding up database analysis even more. An example of this is the calculation of a "hash" function on the values of specified fields from a record, some of whose fields of data are to be transferred to the CPU 26. A hash function is a numerical key assigned to a collection of numeric or non-numeric field values that speeds up the process of searching through a list of records. Other examples of useful information that can be computed by the filter unit 282 include running sums or averages of field values from one record to the next. All of these benefits accrue from the filter unit's 282 ability to parse the data into records and fields as it transfers the data from the disk 23 to the CPU 26.

F. Detailed Description of PSDP Architecture

The preferred embodiment of the PSDP 28 is now described in further detail. The PSDP 28 is in one sense an On-Line Analytic Processing (OLAP)-oriented disk drive interface. It contains logic that is capable of identifying records, filtering out the unwanted records, and selecting fields for return. It therefore dramatically increases database analysis speed by identifying and returning selected fields from requested records.

Figure 5:
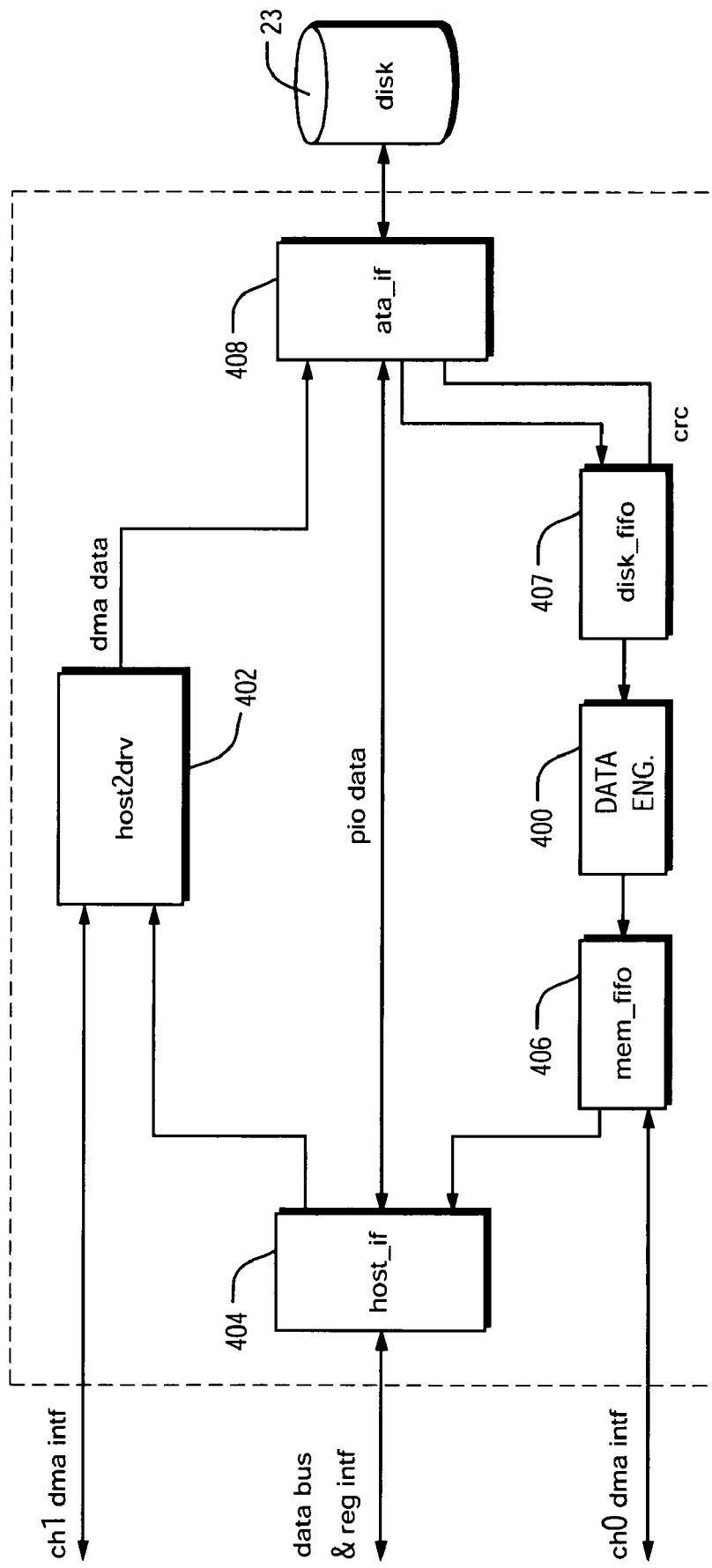
FIG. 5 is a block diagram of a Programmable Streaming Data Processor (PSDP) component of the JPUs of one embodiment.

As shown in FIG. 5, a PSDP 28 consists of a finite state machine (called the Data Engine) 400 to carry out filter logic and other control operations, a host interface 404, a disk interface, here the ATA interface 408 for connection to the disk 23, First-In-First-Out (FIFO) memories 406 and 407, and a DMA host driver 402.

The PSDP 28 has two major functions: to act as disk controller 281 while moving data between memory and the disk 23, and to process or "filter" 282 disk data during filtered reads from the disk 23. In acting as the disk controller 281, the PSDP translates signaling used on the JPU, such as PowerPC compatible interface signaling to the interface used in the disk 23, such as the Integrated Device Electronics (IDE) interface as defined by ANSI NCITS 340-2000. The PSDP 28 supports both a Programmed I/O (PIO) Mode-2 for register access and a UDMA (Ultra-Direct Memory Access) mode-4 for data transfers.

The terms "flow through" and "filtered" are used to differentiate DMA reads. In flow-through mode, also referred to as raw read mode, data moves directly from the input to the output of the data engine 400 without being filtered. Data that is filtered has been processed, perhaps by culling records via the comparison and/or transaction ID circuits, but certainly by reformatting the records into tuple format, during which uninteresting fields can be dropped and PSDP-generated fields added. The processing of culling records is called the "restrict". The process of formatting fields into tuples is called the "project" (pronounced, as in "throwing" something.)

There are three DMA modes: write, raw read, and filtered read. For all three, the PSDP 28 shadows the read/write disk command in order to control its own DMA state machines. It does not shadow the disk address or sector count, nor does it have access to the memory addresses. For writes and raw reads, the PSDP 28 blindly moves data from one interface to the other until the JPU 22 disables the mode. The JPU 22 knows the quantity of data to be moved for these modes and uses the disk and DMA controller interrupts to identify the end of transfer. For filtered reads, the quantity of data to be transferred to memory is generally unknown, and the JPU identifies the end of transfer from the disk and filter interrupts. All of the record info-header and data-can be projected during a filtered read, but the block header info can only be returned by a raw read. DMA data integrity is protected across the disk interface by the IDE CRC check.

As mentioned already, during disk read operations, the PSDP 28 can filter data (or perform other operations on the data) as it is being read from the disk 23. More specifically, the PSDP parses the disk data and identifies block, record, and field boundaries. Data from specified fields are transformed and compared with data from other fields or with constants. The comparisons are combined to determine if a record is wanted (this is referred to as a restricted scan of the database). If so, data from fields to be returned (referred to as selected or projected fields) are returned to JPU memory. If a record is not wanted, the PSDP ignores it and proceeds to the next record. Details are in the Filter Unit section.

As alluded to above, the PSDP 28 operates in two modes. It can return raw disk sectors in block read mode; and it can process the records within the disk block and selectively return specified fields in filtering mode. A special case of filtering mode is the return of all records without any modifications whatsoever, with or without any record header elements. In filtering mode, the Filter Unit 282 pulls disk blocks from a Disk Read FIFO 407, feeding them through the Block Header, Record Header, NULL Vector, Transaction ID, Field Parse, and Filter circuits. Fields to be returned are pushed into the Memory Write FIFO 406. Notice that this version of the chip does not return transformed fields. In fact, the only tuple entries created by the PSDP are the record address, tuple length, and tuple status.

Figure 6:
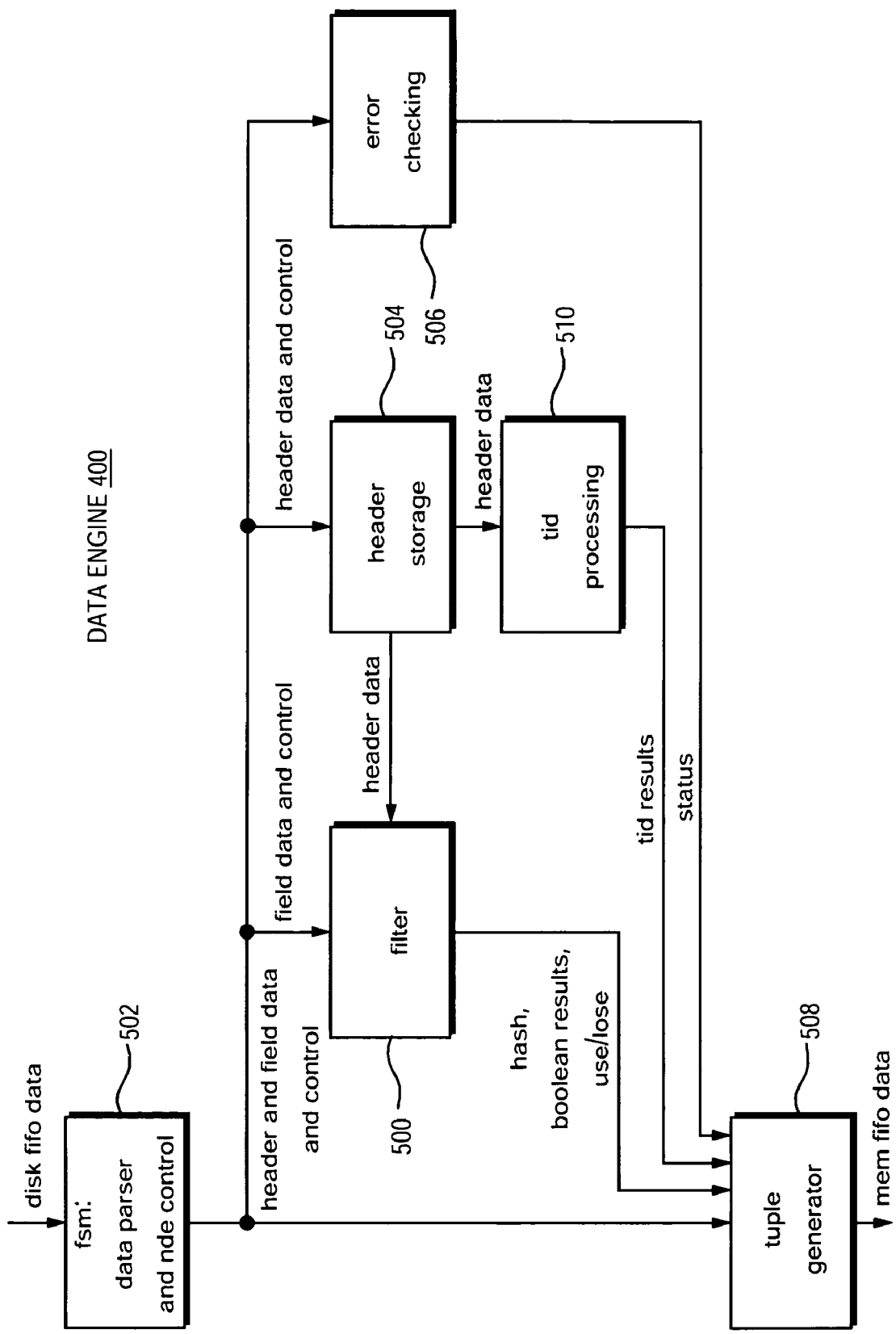
FIG. 6 is a more detailed view of portions of the PSDP of FIG. 5.

The Data Engine 400, as shown in FIG. 6, includes filter logic 500, a data parser block 502, header storage 504, transaction ID processing 510, error checking 506, and output tuple generator 508. In general, the data parser 502 is responsible for taking information from the disk 23 and formatting it into headers and fields so that the filter logic 500, header storage 504 and error checking 506 blocks can perform their respective tasks. The tuple generator 508 takes the output of the filter 500 and TID processing 510 blocks and formats the results in a "tuple" (e.g., record) suitable for processing by the JPU 22 or host 12.

Raw user table data as read from the disk 23 is understood and interpreted by the data parser 502. In one preferred embodiment at the present time, user table data is stored on disk in 128 KB segments called "blocks". Each block begins with an 8-word header, followed by 0 or more records. The format of the block header may be as follows:

| Block Header Field | Size | Details |
| --- | --- | --- |
| Magic number | 4B | identifies beginning of block, always "FEEDFACE" |
| CRC-32 | 4B | not used |
| Block number | 4B | within the table, 0 based, only 19 significant bits |
| Block address | 4B | starting sector number of the block |
| Block length | 4B | in bytes, including header, but not trailing 0's |
| Layout ID | 4B | like a version number on the data format |
| Table ID | 4B | the Postgres object ID that uniquely identifies the table |
| Sector count | 1B | defines block size, 0 means 256, as of this time, it's always 0 |
| Record count | 3B | number of records in the block, 0 means 0 |

The CRC-32 is meant to be computed by software and written to the disk along with the rest of the block header. Its calculation was to include all data from the block number through the end of the last sector of the block, including any trailing 0's. Its primary purpose was to detect data corruption resulting from hardware or software bugs, but it could have detected disk data-retention problems as well. It is unrelated to the UDMA-mode CRC-16 calculation required by the ATA-5 specification, which only guards the physical interface between the PSDP and disk-drive IO buffers.

The sector count is the number of sectors in the block, which must be from 1 to 256. Thus a 0 in this 1-byte field means 256. The sector count occupies the most-significant byte of the last word of the block header.

The record count is the number of records in the block, which may be 0. Although the record count occupies the least-significant three bytes of the last word of the block header, only 13 bits are used, which is curious because a trivial record format could result in 215 records.

A record is typically composed of a record header and one or more data fields, where the record header consists of three special fields, a length, and a null vector. The special fields are the row number, created transaction ID, and deleted transaction ID. All of the record header entries are optional on a per-table (not per-record) basis, as described in the Programmer's Guide. However, if the record has a null vector, it must also have a record length, but not vice versa. The data types are described above in the data types section.

| Record Header Field | Size | Detail |
| --- | --- | --- |
| Row number | 0 or 8B | existence per RowNumberSize register |
| Created XID | 0 or 8B | existence per CreatedXIDSize register |
| Deleted XID | 0 or 8B | existence per DeletedXIDSize register |
| Record length | 0 or 2B | size per RecordLengthSize register |
| Record NULL vector | 0 to 512B | size per FieldCount register |

The row number (sometimes called row_num) is the unique number of the row or record in the user's table. It is distinct from the row address (sometimes called row_addr), which is the complete physical address of a row in node-table-block-record format. The row number is also distinct from the record number, which is the 0-based ordinal number of a record within a block. The record number is the final component of the row address. The row address is computed by the PSDP 28.

The created XID field contains the number, or ID, of the transaction that created the record.

The deleted XID. How can a record exist if it's been deleted, let alone contain the ID for the transaction that deleted it? Turns out records aren't really deleted. Instead they're marked as deleted so they can be restored if the transaction that did the deleting is rolled back. (There are system management tools to reclaim the space.) A value of 0 indicates the record has not been deleted. A value of 1 indicates that the record was created by a transaction that was rolled back.

The record length field indicates the length of the record in bytes, excluding the row number and the transaction IDs, but including the record length, the record null vector, the data fields, and any pad bytes at the end of the record needed for proper alignment of the first item of the following record. Thus, it is the distance in bytes from the beginning of the record length field to the beginning of the next record. Note that although all records in a table must have the same makeup, record lengths may vary because of variable-length character fields. The RecordLengthSize register defines record length sizes of 0, 1, 2, and 4 bytes, but only 0 and 2 are used.

The record null vector specifies which fields in the record are null, thereby indicating validity, not existence. For instance, a null varchar is not the same as an empty one. The record null vector must consist of an even number of bytes. Copernicus assumes that, if it exists, the record null vector has the same number of bits as the record has data fields, and computes the number of half-words in the null vector as (FieldCount+15)>>4. This vector is an array of bytes. Bit 0 of the byte immediately following the record length corresponds to the $0^{th}$ data field; bit 7 of that byte corresponds to the $7^{th}$ data field; bit 0 of the last byte of the word that contains the record length corresponds to the $8^{th}$ data field; and so on.

There are strict rules governing field order and alignment. Both the record and its first data field must start on a word boundary (addr[1:0]=0). All record fields are self-aligned up to word boundaries. This means that 16, 12, 8, and 4 byte fields are word-aligned, 2-byte fields are ½-word-aligned (addr[0]=0), and 1-byte fields can start anywhere. The row number, created XID, and deleted XID are all 8 byte fields and do not require pad bytes to align them. If there is a record length but no record null vector, two pad bytes are required following the record length. If the record null vector exists, it immediately follows the record length and naturally starts on a two-byte boundary, but two pad bytes may be required following the record null vector to properly align the first data field. The physical order of data fields, which often is not the same as the logical order, takes care of aligning non-character data fields; the physical order is N16, T12, N8, I8, F8, N4, I4, F4, D4, I2, D2, I1, C1, C2, . . . C16, V2. The fixed-length character fields are packed in as tightly as possible and are not aligned. Variable-length character fields start with a 2-byte length; they are ½-word-aligned and may require a preceding pad byte. Up to three pad bytes may follow the record's last data field in order to align the next record. If so, they are counted in the length of the earlier record.

A project function encompasses the selection of record fields, the generation of new fields, and the tuple formation and return. Tuples typically consist of a row number, some data fields, and a 2-byte length/status, but they can also include the created and/or deleted transaction IDs, the row address, up to 255 pad words, the 32 instructions results formed into a Boolean word, the hash result, and a null vector.

The hash is used to organize similar tuples into groups for SW processing for joins or grouping selects, and with the exception of the record null vector and length/status, all record-header and data fields can be used in its calculation. There are 7 defined hash modes, but the only one used is the full CRC, which calculates a 32-bit CRC hash starting with a seed of zero and using all of the bytes of all of the fields selected. Blank spaces in character fields are skipped, as are leading 0's in numerics and integers. At this time, leading 1's in negative numbers are included, but there's a move afoot to reverse this. Hash operations are defined on a per-field basis by the comparison instructions.

Within the PSDP 28, a "tuple" is used to describe projected data as provided by the tuple generator 508. The tuple generator 508 uses principally the filter 500 output but can also use TID processing 510 and error checking 506 outputs. The term "tuple" is used here for the purpose of differentiating disk 23 and PSDP 28 output record formats. A tuple can contain fields projected from the source record and up to six "virtual" fields: row address, pad words (tuple scratch pad), the Boolean results from each of the filter operations, a hash result, the tuple null vector, and the tuple length. All are optional on a per-table basis.

G. Query Processing Example

As an aid in the illustrating how the invention system processes data, an example database containing store sales data is presented next. The example defines a SalesDetail data table, a Customer data table, and a Store data table as follows:

SalesDetail
  StoreID
  CustomerID
  SaleDate
  ProductCategory
  Units
  Amount
Customer
  CustomerID
  Gender
Store
  StoreID
  StoreLocation A sample query might be "show me the total units and dollar amount of rain gear sold to females in North Carolina in year 2000, by customer ID." This can be translated into the SQL statement:

SELECT SalesDetail.CustomerID AS "CustID",
  Sum(SalesDetail.Units) AS "Sales Units",
  Sum(SalesDetail.Amount) AS "Sales Amount"
FROM SalesDetail, Customer, Store
WHERE SalesDetail.StoreID=Store.StoreID
  AND SalesDetail.CustomerID=Customer.CustomerID
  AND Store.StoreLocation="NC"
  AND Customer.Gender="Female"
  AND Year(SalesDetail.SaleDate)="2000"
  AND SalesDetail.ProductCategory="Raingear"
GROUP BY SalesDetail.CustomerID;

An output from this sample query showing the total units and dollar amount of rain gear sold to females in North Carolina in 2000 by customer ID can be shown in tabular format:

| CustID | Sales Units | Sales Amount |
| --- | --- | --- |
| 021442 | 1,300 | $45,000 |
| 021443 | 1,200 | $41,000 |
| 021449 | 1,800 | $60,000 |
| 021503 | 3,500 | $98,000 |
| 021540 | 4,200 | $112,000 |
| 021599 | 5,000 | $150,000 |
| 021602 | 4,700 | $143,000 |
| 021611 | 4,100 | $104,000 |
| 021688 | 3,600 | $101,000 |
| 021710 | 2,000 | $65,000 |
| 021744 | 1,200 | $41,000 |
| 021773 | 1,500 | $43,000 |

Using the above example, a basic execution plan can be created by the SQL expression 207, plan generator 204 and plan optimizer 205 of host computers 12. The plan might specify, for example, to perform joins and aggregations on the JPUs 22, with restriction functions being performed on the Programmable-Streaming Data Processor (PSDP) 28.

| Job | Locale | Operation |
| --- | --- | --- |
| 1 | JPU | SCAN Customer |
|  | PSDP | RESTRICT Gender = "Female" |
|  | JPU | PROJECT CustomerID |
|  | JPU | SAVE AS TEMPCustomer |
| 2 | JPU | SCAN Store |
|  | PSDP | RESTRICT StoreLocation = "NC" |
|  | JPU | PROJECT StoreID |
|  | JPU | BROADCAST AS TEMPStore |
| 3 | JPU | SCAN SalesDetail |
|  | PSDP | RESTRICT ProductCategory = "Raingear" AND Year(SaleDate)="2000" |
|  | JPU | PROJECT CustomerID, StoreID, Units, Amount |
| 4 | JPU | JOIN WITH TEMPStore, StoreID=TEMPStore.StoreID |
|  | JPU | PROJECT CustomerID, Units, Amount |
| 5 | JPU | JOIN WITH TEMPCustomer, CustomerID=TEMPCustomer.CustomerID |
|  | JPU | PROJECT CustomerID, Units AS "Units", Amount AS "Amt" |
| 6 | JPU | GROUP By CustomerID |
|  | JPU | AGGREGATE Sum(Units) AS "Units", Sum(Amt) AS "AmtTotal" |
|  | JPU | PROJECT CustomerID, "Units", "AmtTotal" |
|  | JPU | RETURN HOST |
| 7 | HOST | RETURN USER |

In this example, with reference to FIGS. 1 and 3, the query is passed from a user 21, 36, 39 (say Intelligence Applications 39 for this example) over the external network 33 to the host 12. On the host 12, Postmaster/Postgres 201, 202 and Plan Generator 204 respond to the query by parsing it and creating tentative execution plans. The Plan Generator 204 takes into consideration the unit of input and output (i.e., streams of records) of the operators and generates record processing plans accordingly such as to avoid intermediate materialization. Techniques of U.S. Provisional Patent Application 60/485,638 for "Optimized SQL Code Generator II" previously referenced may be used. The tentative execution plans not only specify the above job description, but also may specify whether jobs can run concurrently or must run in sequence on the JPUs 22. The Plan Optimizer 205 selects one of the plans and optimizes that plan and passes it to the Plan Link. The Plan Link 206 expands the plan as necessary, based on where parts of the plan will be executed, and then passes the expanded plan to the Host Dispatch 208. The Host Dispatch 208 sends individual jobs within the plan to the respective locales (JPUs 22) for execution. In this example, jobs 1-6 are sent to the JPU 22 for execution with job 7 reserved for host 12.

For example, Job 1 scans the Customer table with the required restriction and projection, and materializes it. Job 2 scans the Store table with the required restriction and projection, and since it is a small table, broadcasts the resulting tuples (record data) to all JPUs 22, where the tuples (record data) from all the JPUs 22 are then accumulated and saved in memory as TEMPStore. Jobs 1 and 2 are specified or determined to run concurrently if possible.

The Host Dispatch 208 may thus combine Jobs 3-6 into one streaming job because they can all be implemented in a streaming manner without materialization of intermediate result sets. This combined job scans the SalesDetail table, with its restrictions and projections. As the tuples are received from the scan run by the PSDPs 28, each tuple is joined with TEMPStore and TEMPCustomer and aggregated. On the aggregation node, as each new customer ID is received, the previous one and its sums are sent to the host 12, where Job 7 is then invoked in a streaming fashion, to return the aggregated tuples (subsequently formatted into records) through the ODBC connection 38 back to the user 39. Materialization is thus delayed from Jobs 4 and 5 and performed in Job 6 just before returning the results of aggregating to the host 12 autonomous/asynchronous.

Alternatively, a JPU 22 may combine Jobs into one streaming job similar to the Host Dispatch 208 discussed above.

Figure 7:
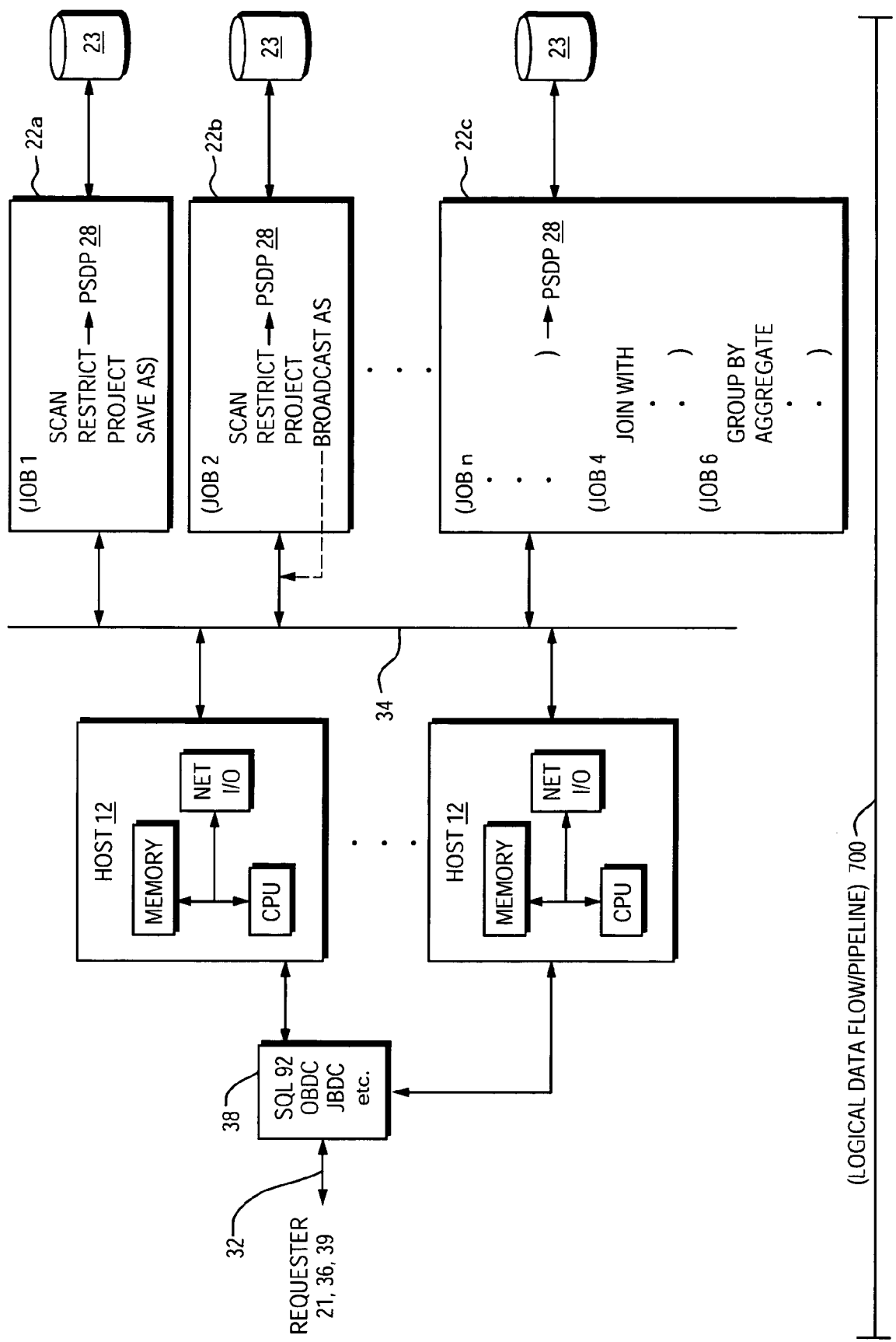
FIG. 7 is a flow diagram illustrating how the invention system processes jobs and advantageously employs streaming record processing.

FIG. 7 further illustrates how the exemplary query is processed by a host 12 and set of JPUs 22 in the second group using the streaming record processing of the present invention. In particular, each Job 1-7 is formed of a respective sequence of operations using software operators SCAN, RESTRICT, PROJECT, SAVE AS, BROADCAST AS, JOIN WITH, GROUP BY, RETURN, etc. In a given sequence, each operator allows as input the stream of record data (or tuples) output from the immediately preceding operation and corresponding operator. Thus the operators enable a connection to be made, with regard to data flow (i.e., flow of streams of record data), within each Job 1-7 and across Jobs 1-7. Where each of the Jobs 1-7 are distributed among the JPUs 22 and hosts 12, there is a respective JPU22/host 12 per job and the flow of record processing proceeds from one operator to the next within a job of a JPU 22/host 12 and then across the respective JPUs 22/hosts 12 of Jobs 1-7.

For purposes of illustration, FIG. 7 shows JPU 22a processing Job 1, JPU 22b processing Job 2 and JPU 22c processing Job 4. According to the first operation of Job 1, JPU 22a scans the Customer table and streams the record data output from this scan operation into the next operation (RESTRICT Gender="Female") of the Job 1. The PSDP 28 of JPU 22a receives this stream of output record data and uses it as input for the RESTRICT operation. Record data (tuples) output from the RESTRICT operation are likewise streamed into the next operation (PROJECT customer ID) of Job 1, and so forth. As such, JPU 22a processes data in a record by record streaming fashion through each operation of Job 1 and without, at each operation, necessarily materializing the data (record) being operated on.

Similarly, JPU 22b processes Job 2 beginning with scanning the Store table. The resulting stream of record data output by this SCAN operation is input into the next operation (RESTRICT store location="NC") of Job 2. The PSDP 28 of JPU 22b is responsive to the streamed input and performs the RESTRICT operation. The resulting stream of record data (tuples) is provided as input to the next Job 2 operation (PROJECT StoreID), and so on. As a last operation in Job 2, JPU 22b broadcasts over internal network 34 a stream of record data as TEMPStore.

JPU 22c processing Job 4 receives the broadcast stream of record data from JPU 22b and uses the same as input into the first operation of Job 4 (JOIN WITH TEMPStore) and likewise processes this received stream of record data. In this way, there is a flow of record data on a logical data path 700 as prescribed by the Jobs 1-7 being processed within nodes 22, 12 and across nodes 22, 12. In particular, streams of record data follow a data flow pipeline defined by the sequence of job operators within nodes 22, 12 and across nodes 22, 12 of the system network. The pipeline 700 extends from disk 23 to JPU 22 memory, to internal network 34, to host 12 memory, to ODBC connection 38 or other connection to the end user requester 21, 36, 39.

Restated, the logical data path 700 is formed of node locations and operators and more generally may be referred to as data flow of the streams of record data being processed. The record data being passed and processed may be a reference (pointer or handle or the like) to a subject record where operations do not necessarily materialize the data being operated on.

The foregoing processing of streams of record data is further based on readiness of record data to be passed for processing from one part (e.g. node location or job operation) to a next part (e.g. node location or job operation) along the logical data path 700 (that is, from one job operation to the next within a Job or across logically successive Jobs 1-7). The record data in the streams of records being processed may be in various states at different node locations. The states may include records coming off disk 23, reference pointers or handles to data fields of records, broadcast data, data packets and materialized network data packets. In the example of a merge aggregation operator, record readiness may be based on a key index value. The merge aggregation operator aggregates a sorted record stream and outputs the aggregation associated with a current key index value whenever a new key index value is received as input.

In another operation involving a buffer of records, record readiness is determined by buffer status. For example, the JPU communication layer 300 sends a partial set of records across the network 34 when its buffers are filled, without waiting for the job (sequence of operations/operators thereof) that produced the records to complete before sending any of the records across the network 34.

In accordance with the foregoing, certain ones of the software operators materialize data and do so as sets of records. Other operators delay materialization of record data as in Jobs 3, 4, and 5 of the above example. Yet other operators provide links, pointers or other references to interim results (instead of passing whole record data or materialized data) toward enhancing the JPU memory savings effect of delaying materialization. That is, record data are processed at intermediate locations on the logical data path 700 as a collection of data field values in a manner free of being materialized as whole records between two successive operators. The data field values further do not need to reside contiguously within memory. Also see U.S. Provisional Patent Application No. 60/485,638 for "Optimized SQL Code Generator II" filed Jul. 8, 2003, herein incorporated by reference, for additional techniques on handling intermediate results.

One example of the foregoing is a join operator. The join operator has multiple input streams and an output stream with references to original records in their packed form. The output stream of the join operator refers to data field values within the record data of the input streams at known offsets from a base pointer to a start of a packed record.

As shown in FIGS. 7 and 4A, there are a number of JPUs 22 each with job queue and job scheduler components. Elements of the Sales Detail records (Job 3) would be distributed across multiple JPUs. For example, three JPUs handle store information and various dedicated portions of the Sales Detail database. Thus, for example, no one record is replicated and any one record is preferably accessed and manipulated exclusively by products of one of the JPUs 22.

Each JPU resource scheduler 322 allocates priority to jobs based upon local resource availability conditions. Typically, JPU memory is a high demand resource. Jobs that make a relatively high demand on memory reserves may be given lower priority that other jobs. Other schemes and parameters or characteristics may be employed to determine priority to assign the various jobs. For example, desired completion time or estimated demands on other resources such as JPU disk and/or network IO demand, user specified priority and others may be used. The scheduler 322 is non-preemptive and is not time sliced but rather is a resource based priority scheme type scheduler. The resource scheduler 322 within each JPU 22 thus decides what each JPU does at any given instant in time based upon what its local conditions are. In an example illustrated in FIG. 7, JPU 22b will typically finish its operations first before JPU 22a. This is because the restrict operation requiring selection of records where the gender field is equal to "FEMALE" will require much more work by JPU 22a where the number of North Carolina stores for the restrict operation in JPU 22b is small in comparison.

The preferred embodiment utilizes asymmetric scheduling whereby each JPU22 is able to schedule jobs for itself without regard to how jobs are scheduled for other JPU's. This allows each JPU to complete its assigned tasks independently of other JPU's thereby freeing it to perform other tasks. Where many requesters (users or applications) 21, 36, 39 are making multiple requests on multiple databases at substantially the same time, it is understood that the job queue within a given JPU will quickly become filled with different instructions/operations to perform. By making the JPU operations asynchronous the overall throughput is greatly increased here.

The job listener component 210 in the host 12 first coordinates job responses from multiple JPUs 22. In particular, the job listener 210 waits to receive results data from each JPU before reporting back to the Host/Event Handler 252 that a particular job has been completed. To expedite this, each job can be tagged with a unique job identifier (JID). When each JPU returns results from its respected aspect of a job, the JID is included, as well as an identifier for the JPU. The Host Event Hander 252 thus knowing how many JPUs 22 are active can then tally responses from the JPUs to ensure that job identifiers are received from each before taking the next step in a plan that has jobs that must be run sequentially and before reporting results back to the requesting user/application 21, 36, 39.

The fact that each JPU in effect "owns its own data" is another important aspect of enabling asynchronous and autonomous operation. Because each JPU need not wait for other JPUs 22 or other components to complete a job, the storage manager 320 within each JPU also provides support for functions such as error checking, creation and deletion of tables, the use of indices, record insert and delete, mass loading of existing user data among various JPUs, and the like.

While this invention has been particularly shown and described with references to preferred embodiments thereof, it will be understood by those skilled in the art that various changes in form and details may be made therein without departing from the scope of the invention encompassed by the appended claims.

What is claimed is:

1. An asymmetric data processor comprising:
   one or more host computers, each including a memory, a network interface and at least one CPU, each host computer being responsive to requests from end users and applications to process data;
   a plurality of Job Processing Units (JPUs), each having a memory, a network interface, one or more storage devices, and at least one CPU, each JPU being responsive to requests from host computers and from other JPUs to process data;
   a network enabling the host computers and the JPUs to communicate between and amongst each other, each of the host computers and JPUs forming a respective node on the network; and
   a plurality of software operators configured to process data at the nodes according to a logical data flow, wherein (i) for each operator in a given sequence of operators in the logical data flow, output of the operator is input to a respective succeeding operator in the sequence in a manner free of necessarily materializing data, and (ii) data processing at each operator is based on readiness of a record, such that the operator transmits ready record data for processing at a successive operator in the logical data flow independent of transmission at other operators, the transmission of ready record data during data processing being substantially continuous so as to form a stream of record processing from operator to operator within nodes and across nodes of the network;
   wherein record data are processed at intermediate parts on the logical data flow as a collection of data field values in a manner free of being materialized as whole records between two successive operators; and
   wherein the plurality of operators includes one or more join operators, each join operator having multiple input streams and an output stream with references to original records in their packed form, and the output stream for the operator referring to data field values within the record data of the input streams at known offsets from a base pointer to a start of a packed record.

2. A processor as claimed in claim 1 wherein the record data in the stream of record processing may exist in various states at different operators in the logical data flow, the states including at least one of on disk storage, within JPU memory, on the network, within host computer memory, and within an ODBC connection with an end user or application.

3. A processor as claimed in claim 1 wherein the plurality of operators includes a merge aggregation operator that determines record readiness based on a key index value, such that the merge aggregation operator aggregates a sorted record stream and outputs the aggregation associated with a current key index value whenever a new key index value is received as input.

4. A processor as claimed in claim 1 wherein record readiness is determined by buffer status such that a communication layer sends a partial set of records across the network when its buffers are filled, without waiting for a working sequence of operators that produced the record data to complete before any records are sent across the network.

5. A processor as claimed in claim 1 further comprising at least one programmable streaming data processor (PSDP) coupled to a respective JPU, the PSDP being one part in the logical data flow and processing data fields within records as buffers of records are received from a storage disk or an external network connection, without waiting to process any records until all records are received.

6. A processor as claimed in claim 5 wherein the data fields are processed by the PSDP to produce virtual fields.

7. A processor as claimed in claim 6 wherein the virtual fields are selected from a group consisting of: a row address, pad words (tuple scratch pad), a Boolean results from each of the filter operations, a hash result, a tuple null vector, a tuple length, and combinations thereof.

8. A processor as claimed in claim 1 wherein each software operator follows a common data handling paradigm such that each operator can operate in any part of the logical data flow, the common data handling including each operator being able to accept one or more streams of record data as inputs and producing a stream of record data as an output.

9. A processor as claimed in claim 8 wherein any operator may take as its input a stream of record data that is produced as the output of any other operator.

10. A processor as claimed in claim 8 wherein certain ones of the operators materialize data and do so as sets of records.

11. A processor as claimed in claim 8 wherein the operators further enable same algorithms to be used for a given operation whether that operation is executed on the host computers or on the JPUs.

12. A processor as claimed in claim 1 in which the JPU's CPU eliminates unnecessary data before it is sent across the network.

13. A processor as claimed in claim 1 wherein at least one of the host computers eliminates unnecessary information before processing a next step of a subject query.

14. A processor as claimed in claim 1 wherein the host computers further include a Plan Generator component, the Plan Generator component generating record data processing plans having operations which take input streams of record data and produce streams of record data as output and which avoid intermediate materialization.

15. A processor as claimed in claim 1 wherein the host computers further include a Communication Layer API that accepts data records as input to a message sent to one or more other nodes.

16. A processor as claimed in claim 1 wherein the host computers further include:
a Job Listener component for awaiting data from other nodes; and
an API which provides streams of record data as output.

17. A processor as claimed in claim 16 wherein the host computers further comprise a Host Event Handler component for managing execution of a query execution plan, the Host Event Handler receiving partial result sets from JPUs through the Job Listener component.

18. A processor as claimed in claim 1 wherein the host computers further comprise a Host Event Handler for managing execution of a query execution plan, the Host Event Handler communicating to JPUs through a Communication Layer component to request partial result sets from JPUs.

19. A processor as claimed in claim 18 wherein the Host Event Handler requests partial result sets from JPU buffers in order to get, sort and process partial result sets held in the JPU buffers instead of waiting for a JPU to fill its buffer and send the data to a host computer.

20. A processor as claimed in claim 1 wherein the host computers include a Loader component which operates in streaming fashion and performs multiple operations on each field value in turn while each field value is held in a host CPU cache.

21. A processor as claimed in claim 20 wherein the Loader component performs operations including one or more of: parsing, error checking, transformation, distribution key value calculation, and saving the field value to internal network output frame buffers.

22. A processor as claimed in claim 1 wherein the JPUs separate the stream of record processing from source of the record data such that various input sources to the JPUs are permitted.

23. A processor as claimed in claim 1 wherein the JPUs further comprise a Network Listener component which awaits requests from other nodes in the network and which returns a stream of record data as output.

24. A processor as claimed in claim 1 wherein the JPUs further comprise a Network Poster component which accepts a stream of record data as input and which sends data to other nodes when its buffers are filled, when jobs are completed or upon an explicit request to do so.

25. A processor as claimed in claim 1 wherein the JPUs further comprise a Storage Manager component whose API and implementation provide for storage and retrieval of record sets.

26. A processor as claimed in claim 1 wherein the host computers are of a symmetric multiprocessing arrangement and the JPUs are of a massively parallel processing arrangement.

27. A processor as claimed in claim 1 wherein a node executes multiple operations on the subject record before processing a next record data.

28. A method of data processing comprising the steps of:
providing one or more host computers, each including a memory, a network interface and at least one CPU, each host computer being responsive to requests from end users and applications to process data;
providing a plurality of Job Processing Units (JPUs), each having a memory, a network interface, one or more storage devices, and at least one CPU, each JPU being responsive to requests from host computers and from other JPUs to process data;
networking the host computers and the JPUs to communicate between and amongst each other, each of the host computers and JPUs forming a respective node on the network;
using a plurality of software operators, processing data according to a logical data flow, wherein (i) for each operator in a given sequence of said operators in the logical data flow, output of the operator is input to a respective succeeding operator in the sequence in a manner free of necessarily materializing data, and (ii) data processing at each operator is based on readiness of a record, such that the operator transmits ready record data for processing at a successive operator along the logical data path independent of transmission at other operators, the transmission of ready record data on the logical data path during data processing being substantially continuous so as to form a stream of record processing from operator to operator across nodes and within nodes of the network; and
processing record data at intermediate locations on the logical data path as a collection of data field values, in a manner free of being materialized as whole records between two successive operators;
wherein the plurality of operators includes one or more join operators, each join operator having multiple input streams and an output stream with references to original records in their packed form, and the output stream of the join operator referring to data field values within the record data of the input stream at known offsets from a base pointer to a start of a packed record.

29. The method of claim 28 wherein the record data in the stream of record processing may exist in various states at different node locations of the logical data path, and the node locations on the logical data path include on disk storage, within JPU memory, on the network, within host computer memory, and within an ODBC connection with an end user or application.

30. The method of claim 28 wherein the plurality of operators includes a merge aggregation operator that determines record readiness based on a key index value, such that the merge aggregation operator aggregates a sorted record stream and outputs the aggregation associated with a current key index value whenever a new key index value is received as input.

31. The method of claim 28 further comprising the step of determining record readiness as a function of buffer status such that a communication layer sends a partial set of records across the network when its buffers are filled, without waiting for a working sequence of operators that produced the records to complete before any records are sent across the network.

32. The method of claim 28 further comprising the step of following a common data handling paradigm for each software operator such that each operator can operate at part of the logical data path, the common data handling including each operator being able to accept one or more streams of record data as inputs and producing a stream of record data as an output.

33. The method of claim 32 wherein any operator may take as its input a stream of record data that is produced as the output of any other operator.

34. The method of claim 32 wherein certain ones of the operators materialize data and do so as sets of records.

35. The method of claim 32 wherein the operators further enable same algorithms to be used for a given operation whether that operation is executed on the host computers or on the JPUs.

36. The method of claim 28 wherein the step of providing host computers includes generating record data processing plans formed of at least one sequence of operators from the plurality of operators, each sequence taking a stream of record data on input and producing a stream of record data as output and avoiding intermediate materialization.

37. The method of claim 28 further comprising the step of accepting data records as input to a message sent to one or more other nodes.

38. The method of claim 28 further comprising the step of managing execution of a query execution plan including requesting partial result sets from JPU buffers in order to get, sort and process partial result sets held in the JPU buffers instead of waiting for a JPU to fill its buffer and send the data to a host computer.

39. The method of claim 28 further comprising the step of performing multiple operations on each field value in turn while each field value is held in a host CPU cache.

40. The method of claim 39 wherein the multiple operations include one or more of: parsing, error checking, transformation, distribution key value calculation, and saving the field value to internal network output frame buffers.

41. The method of claim 28 further comprising the step of separating the stream of record processing from source of the record data such that various input sources to the JPU's are permitted.

42. The method of claim 28 further comprising the step of sending data to nodes when a buffer is filled, when a job is completed or upon request.

43. The method of claim 28 wherein the step of processing includes at a node, executing multiple operations on the subject record before processing a next record data.

\* \* \* \* \*